United States Patent [19]

Egawa

[11] Patent Number: 5,060,007
[45] Date of Patent: Oct. 22, 1991

[54] IMAGE BLUR DISPLAY DEVICE

[75] Inventor: Akira Egawa, Tokyo, Japan

[73] Assignee: Canon Kabushiki Kaisha, Tokyo, Japan

[21] Appl. No.: 644,408

[22] Filed: Jan. 22, 1991

Related U.S. Application Data

[63] Continuation of Ser. No. 498,460, Mar. 21, 1990, abandoned, which is a continuation of Ser. No. 366,241, Jun. 12, 1989, abandoned, which is a continuation of Ser. No. 121,684, Nov. 17, 1987, abandoned.

[30] Foreign Application Priority Data

Nov. 20, 1986 [JP] Japan ................. 61-275434
Nov. 20, 1986 [JP] Japan ................. 61-275435
Nov. 20, 1986 [JP] Japan ................. 61-275436

[51] Int. Cl.$^5$ ............................................. G03B 17/18
[52] U.S. Cl. ............................... 354/430; 354/289.12; 354/471
[58] Field of Search ................... 354/430, 219, 289.1, 354/289.12, 471, 474; 358/105, 224, 222; 350/500

[56] References Cited

U.S. PATENT DOCUMENTS

| | | | |
|---|---|---|---|
| 4,064,533 | 12/1977 | Lampe et al. | 358/105 |
| 4,179,704 | 12/1979 | Moore et al. | 358/105 |
| 4,364,113 | 12/1982 | Sengebusch et al. | 358/105 X |
| 4,408,224 | 10/1983 | Yoshida | 358/105 X |
| 4,430,749 | 2/1984 | Schardt | 358/105 X |
| 4,437,161 | 3/1984 | Anderson | 358/105 X |
| 4,679,086 | 7/1987 | May | 358/105 X |
| 4,862,277 | 8/1989 | Iwaibana | 358/224 X |

*Primary Examiner*—W. B. Perkey
*Attorney, Agent, or Firm*—Robin, Blecker, Daley & Driscoll

[57] ABSTRACT

The present patent application discloses an image blue display device in which the image information in a first time is compared with the image information in a second time to detect a changed place, and this place is displayed as the image blur information.

16 Claims, 30 Drawing Sheets

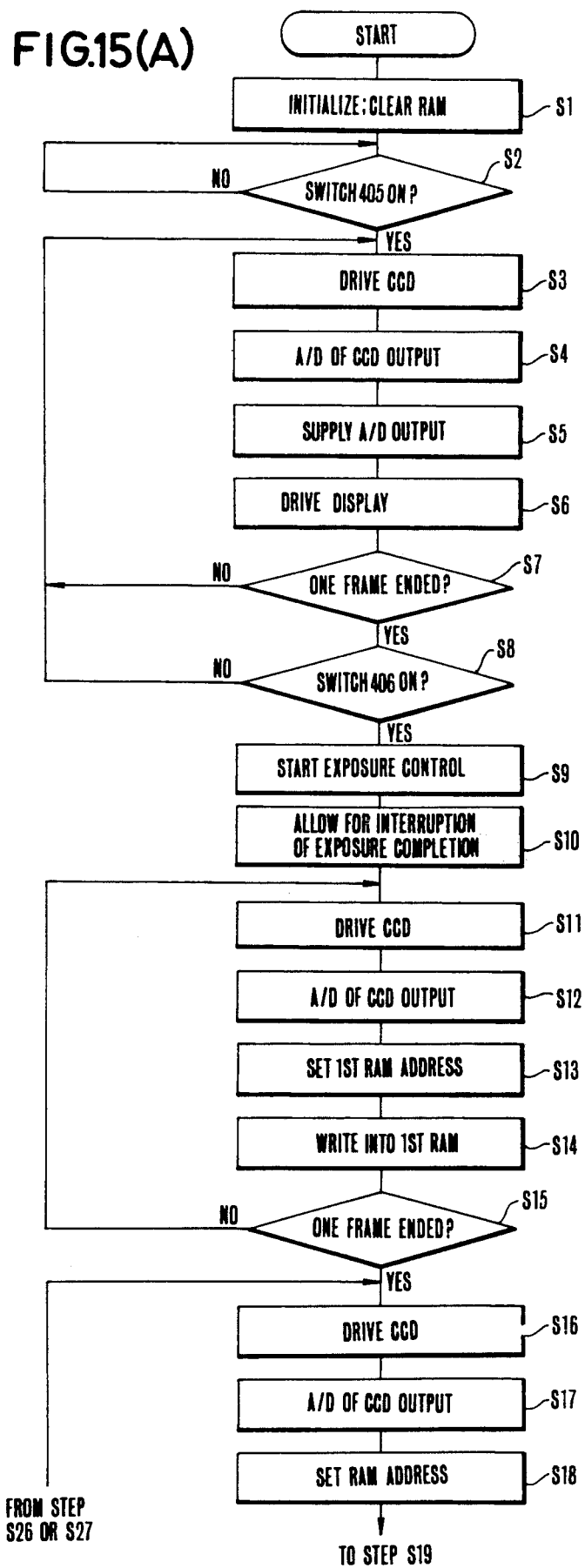

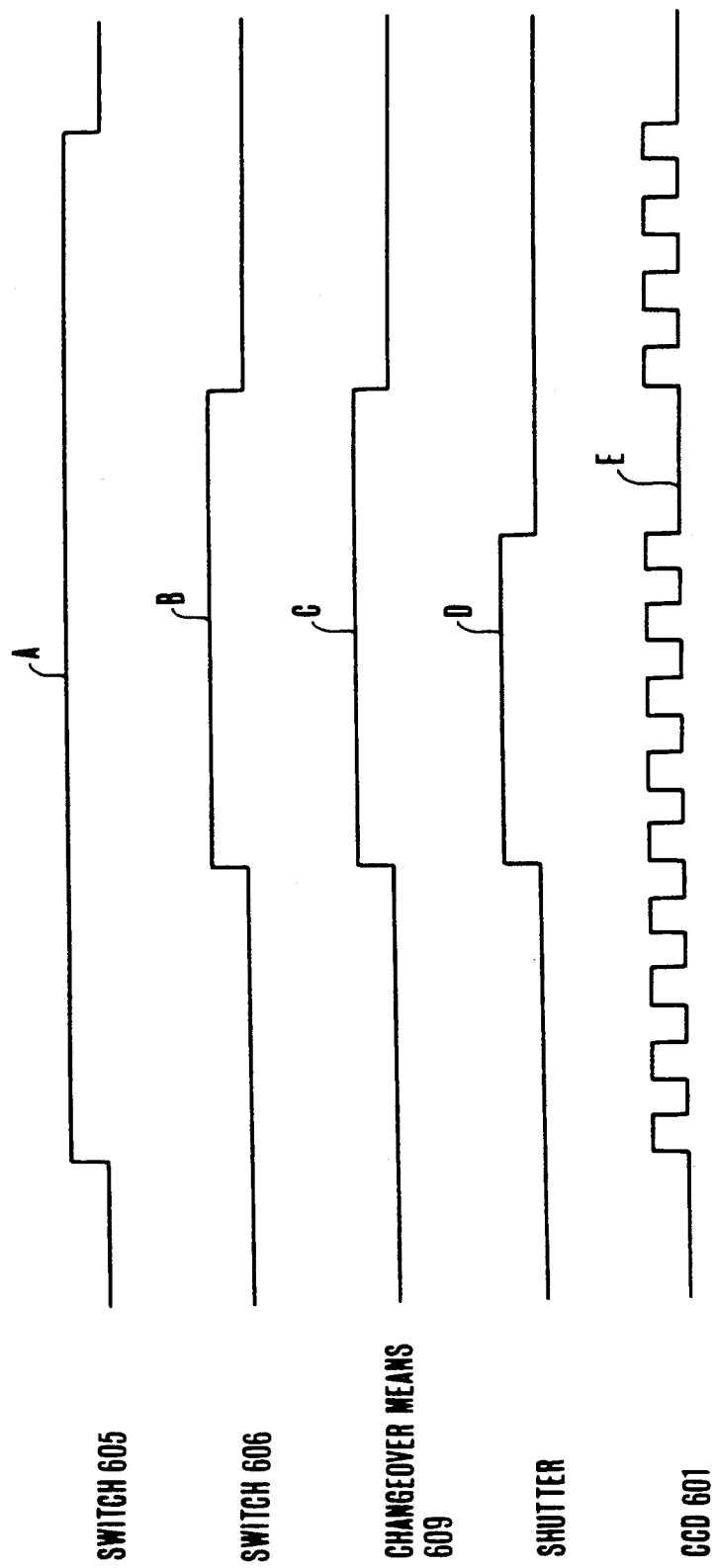

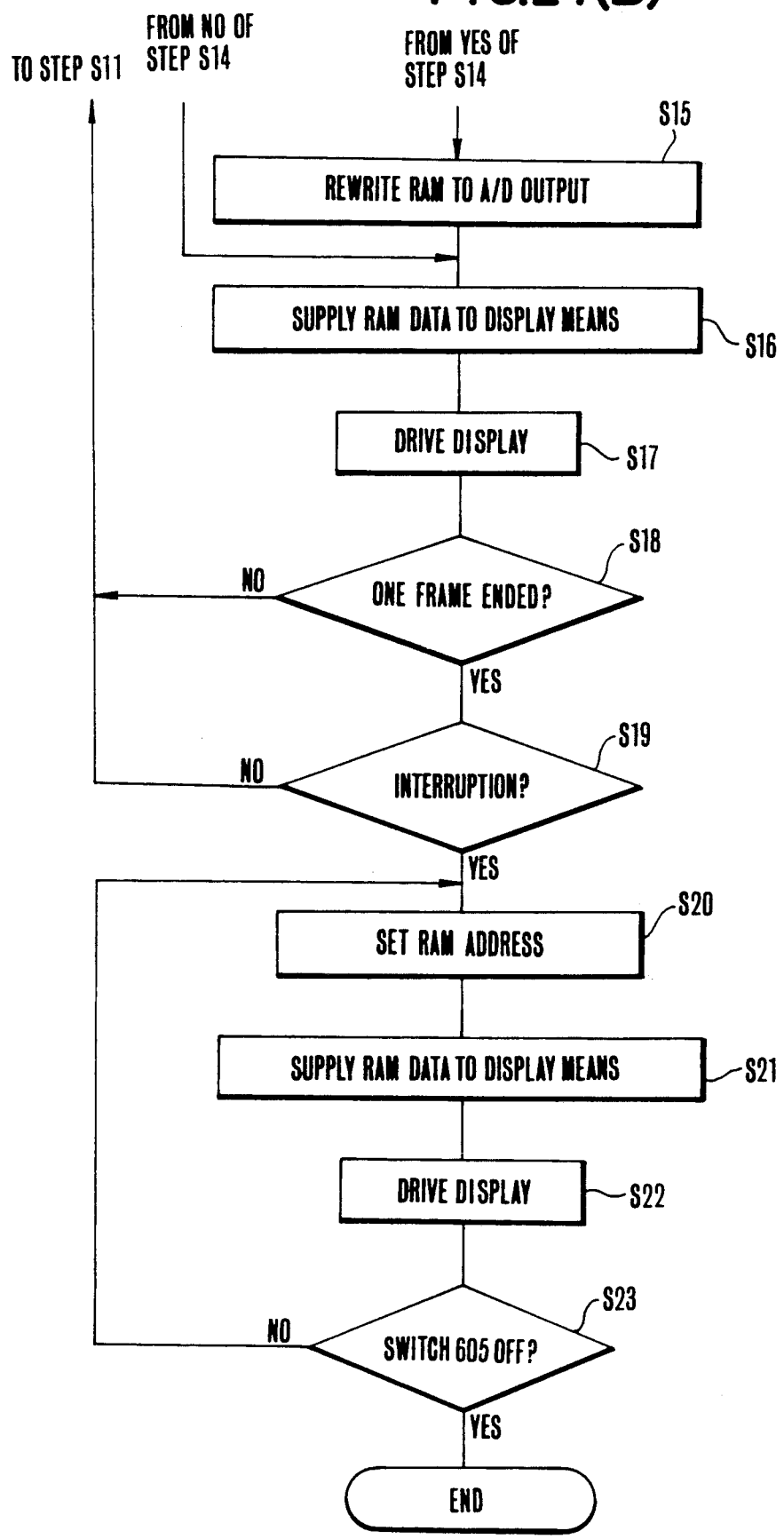

IMAGE BLUR DISPLAY DEVICE

This is a continuation application under 37 CFR 1.62 of prior application Ser. No. 498,460, filed Mar. 21, 1990, now abandoned, which is a continuation of Ser. No. 366,241, filed June 12, 1989, now abandoned, which is a continuation of application Ser. No. 121,684, filed Nov. 17, 1987, now abandoned.

BACKGROUND OF THE INVENTION

1. Field of the Invention

This invention relates to image blur display devices for displaying blurring states of a picture and, more particularly, to image blur display devices for displaying the hand-shake influence of the photographic apparatus such as camera, video camera or still camera equipped with the electronic view finder.

2. Description of the Related Art

In general, when the camera is shaken by the hand-shake or the like, it influences the image so as to be blurred in the photograph taken, or the so-called image blurring takes place with a possibility.

The possibility of occurrence of the image blur differs with different degrees of camera shake. But the choice of slow shutter speeds tends to increase it. Of course, the photographer's ability to camera shake changes from person to person and also as the hour or place changes. In the present state of art, therefore, whether or not an image blur has actually taken place cannot be judged until the film is developed. For this reason, in a situation where the image blur is liable to occur, it has been the common practice to take several shots repeatedly.

So, to solve such a drawback, technical ideas of detecting the blurring of the image to give a warning are proposed by Japanese Patent Publication No. Sho 57-482, Japanese Patent Applications No. Sho 61-198617 to 61-198622 and others.

However, these concern merely with the only technique of warning the image blur, and, because of its being unable to teach the photographer what blurring of the image is taking place, cannot be said to be sufficient.

SUMMARY OF THE INVENTION

The present invention has been made to solve the above-described drawback and is to provide an image blur display device having comparator means for comparing picture information in a first time point with that in a second time point and display means responsive to the output of the comparator means for displaying the changed area of the image as image blur information, with which the photographer can see the blurred state of the image.

Other objects of the invention will become apparent from the following description of embodiments thereof.

BRIEF DESCRIPTION OF THE DRAWINGS

FIG. 15(A), 15(B), 15(C) are flowcharts illustrating an example of the program for control of MPU 501 in FIG. 4.

FIG. 18 is a timing chart illustrating a manner in which the arrangement of FIG. 17 operates.

FIGS. 24(A), 24(B), 24(C) are flowcharts illustrating an example of the program for control in FIG. 23.

DETAILED DESCRIPTION OF THE PREFERRED EMBODIMENTS

The present invention is described in detail in connection with embodiments thereof by reference to the drawings.

Figure 2:
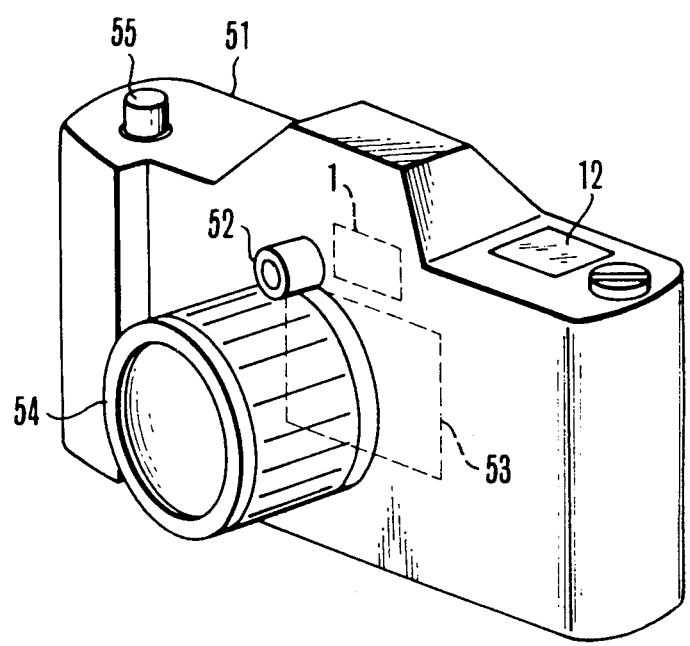
FIG. 2 is a perspective view illustrating an example of the outer appearance in the embodiment of the invention.

FIG. 2 shows the outer appearance in these embodiments.

In FIG. 2, the camera body 51 has an optical system 52 for forming an optical path to a solid state image pickup element (CCD) 1 to be described later, a film surface 53 to be exposed to an object image, an optical system 54 for forming an optical path to the film surface 53, and a shutter release button 55 for actuating switches 5 and 6 to be described later.

12 is display means in the form of an electronic view finder utilizing, for example, liquid crystal, to display the object image as obtained by photoelectric conversion of the solid state image pickup element 1 and the hand-shake amount of the photographer according to the invention.

Figure 1:
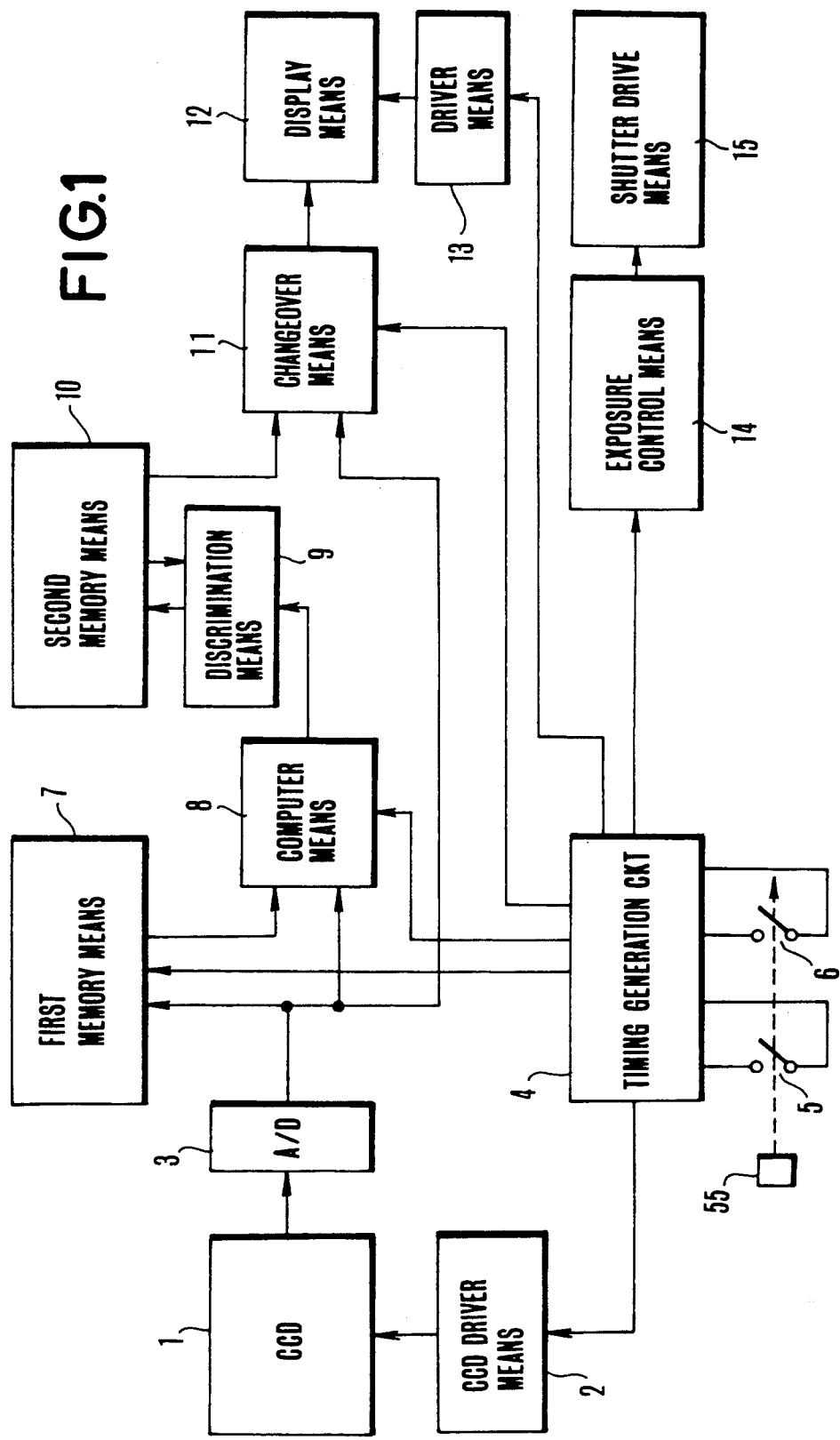
FIG. 1 is a block diagram illustrating an example of the arrangement in a first embodiment of the invention.

FIG. 1 shows an example of the construction and arrangement of the constituent parts in the first embodiment of the invention.

In FIG. 1, a light receiving element 1 in the form of the solid state image pickup element (CCD) 1 receives the same image as the photographic one and converts it to an analog electrical signal. The driving of the light receiving element 1 is controlled by CCD driver means 2. The analog output of the CCD 1 is converted to a digital value by an A/D converter 3. A timing generation circuit 4 produces control signals for every part of the device of the invention in timing relationship.

The switch 5 turns on when the shutter release button 55 of FIG. 2 is pushed to a first stroke. The switch 6 turns on when the button 55 is further pushed to a second stroke. When the switch 6 turns on, an exposure to the film surface 53 is started.

7 is first memory means for memorizing the image signal photo-electrically converted by the A/D converter 3. 8 is computer means for computing the absolute value of the difference (brightness difference) between the previously memorized image signal in the first memory means 7 and the output of the A/D converter 3 in the same image picked up position as this image to produce the result at the output thereof.

Discrimination means 9 determines whether or not the output of the computer means 8 is a larger value than the value memorized in second memory means 10. Only when it is the larger value than the memorized value, the image information of the corresponding image picked up position is rewritten by the output data of the computer means 8.

11 is changeover means for selectively placing the output video data of the A/D converter 3 and the output image data from the second memory means 10 at the output thereof. The changeover means 11 sends the selected output data to display means 12. For note, the display means 12 may be of the liquid crystal type, the type utilizing light-emitting elements (EC), or other types.

The driving of the display means 12 is controlled by driver means 13.

14 is exposure control means for properly controlling the exposure of the film. 15 is shutter drive means for driving shutter blades (not shown) in response to the exposure control means 14.

The operation of this embodiment is described with reference to the timing chart of FIG. 3.

Figure 3:
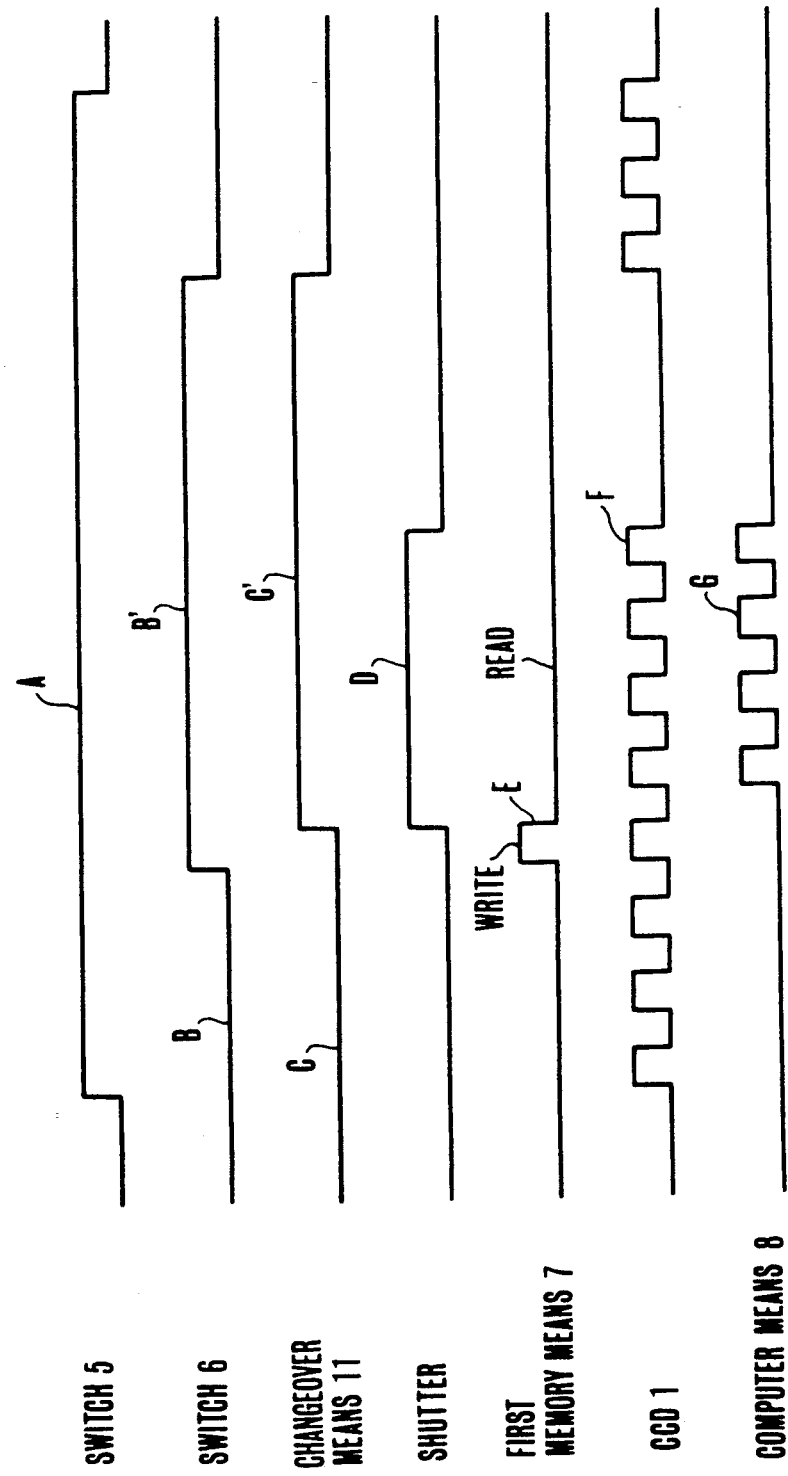
FIG. 3 is a timing chart illustrating a manner in which the arrangement of FIG. 1 operates.

In FIG. 3, when the photographer pushes the shutter button 55 as a preparation for shooting, the first stroke turns on the switch 5, and its output changes to and is maintained at high level for a period in the timing of waveform A until the photographer removes the depression (or it produces a pulse).

Responsive to this, the timing generation circuit 4 produces a drive control timing pulse for driving the CCD 1. The CCD driver means 2 drives the CCD 1 in response to this pulse.

In synchronism with the above-described pulse, the CCD 1 photo-electrically converts the image information formed on the CCD 1 from picture element to element time-serially, and the video information as obtained by the photo-electrical conversion is applied to the A/D converter 3. The A/D converter 3 converts the analog data (image information) produced from the CCD 1 to a digital signal, while taking synchronism.

At this time, another timing signal to be sent from the timing generation circuit 4 to the changeover means 11 becomes a signal of "low level" like a waveform C. Responsive to this signal, the changeover means 11 selects the output of the A/D converter 3 for production at the output thereof. Hence, the display means 12 is real-timely supplied with the output of the CCD 1, and the image received by the CCD 1 is displayed.

For note, similarly to the CCD 1, the driver means 13 is operated by the timing pulse sent from the timing generation circuit 4, driving the display means 12 to display the outputted video.

Also, the timing in which the video data are brought in is determined so that during the time when the CCD 1 produces one pulse of the form F shown in FIG. 3, the display means 12 takes in one frame (one-frame image information).

Next, when the release button 55 is pushed to the second stroke by the photographer, the switch 6 turns on, and its output becomes "high" as shown by the waveform B' of FIG. 3.

In synchronism with this, a data-write signal is produced from the timing generation circuit 4 to the first memory means 7 in the timing shown by the waveform E of FIG. 3. In synchronism with this signal, the image data for one frame from the A/D converter 3 is memorized in the first memory means 7.

Then, the timing generation circuit 4 produces a pulse of waveform C'. During the period of production of this pulse C', the output path is changed over by the changeover means 11 so that the output of the second memory means 10 is applied to the display means 12. Further, the timing generation circuit 4 produces another pulse of waveform D, causing the exposure control means 14 to start. The shutter drive means 15 moves the shutter blades in the timing of the start of waveform D, initiating an exposure. During the period when the opening of the shutter is controlled so as to make a proper exposure, or when the pulse of waveform D occurs, it is in the computer means 8 that the computation for the absolute value of the difference between the data memorized in the first memory means 7 and the data produced from the A/D converter 3 is recycled in each pulse at the timing of waveform G. The output of the computer means 8 is applied to the discrimination means 9. It is then in the discrimination means 9 that whether or not this absolute value of the difference is above that value of the difference which has been stored in the second memory means 10 is examined. When the inputted absolute value of the difference is determined to be above the absolute value of the difference stored in the second memory means 10, the stored data in the second memory means 10 of the corresponding position is rewritten by the computed absolute value of the difference of the computer means 8. And, the data stored in the second memory means 10 are applied through the changeover means 11 to be displayed on the display means 12.

Figure 4:
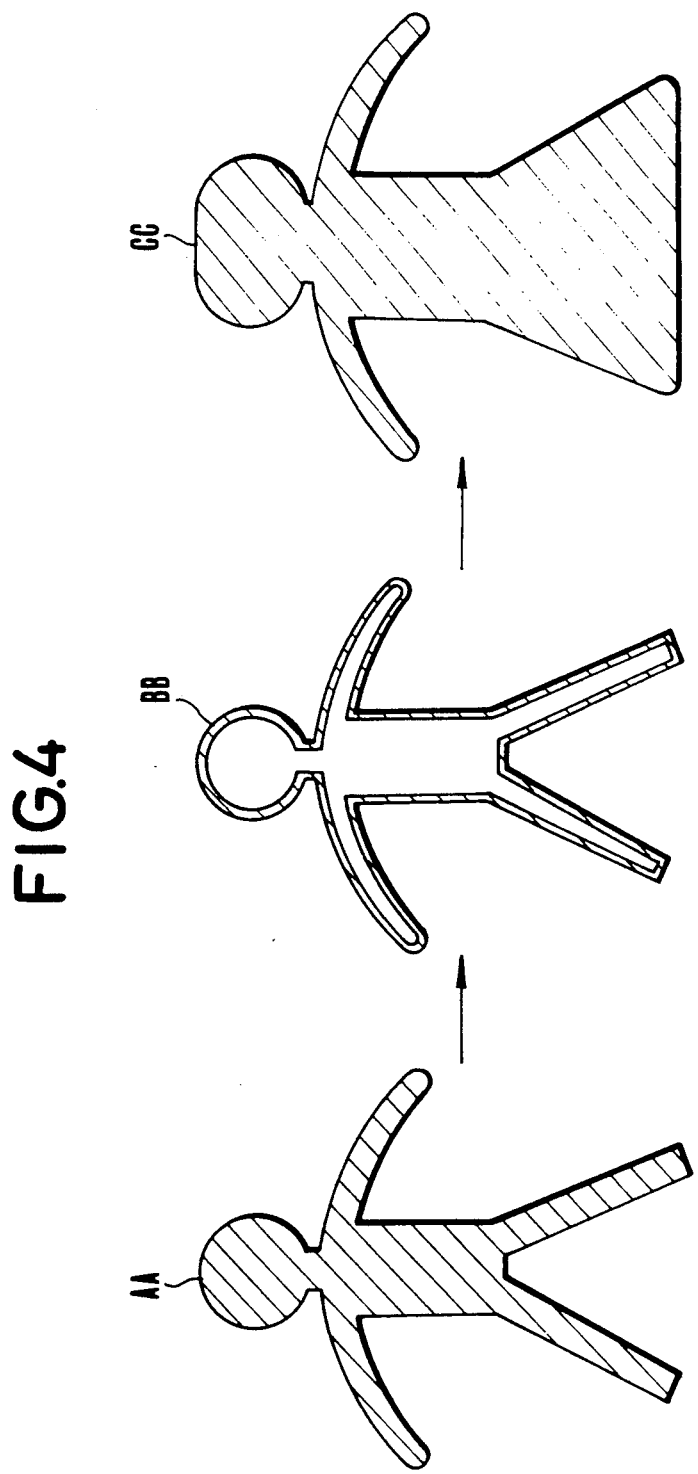
FIG. 4 is pictorial representations illustrating an example of the change of display in the arrangement of FIG. 1.

FIG. 4 schematically shows the image displayed on the display means 12.

In FIG. 4, during the interval from the moment at which the switch 5 has turned on to the moment at which the switch 6 turns on, an image AA to be photographed is displayed in real time on the display means 12. Upon turning on of the switch 6, the display temporarily disappears. If, as the camera is moved by hand shake, the image position changes during the opening of the shutter, a contour image BB is displayed only in that portion which has changed in position on the display means 12. If, as, in addition, the object being photographed moves, the image further changes, the contour displayed is widened like a contour image CC. Therefore, if the photographer has made a hand shake, he can recognize the hand shake amount to the initially aimed composition.

When the shutter blades close, the data of the second memory means 10 are stored without alteration. For this reason, in the display means 12, the display of the image BB or the image CC continues until the switch 6 turns off. When the switch 6 turns off, the changeover means 11 selects the output of the A/D converter 3. Thereupon, the image AA of real time appears again on the display means 12. This implies that the photographer is informed not only of the degree of hand shake but also of when the shutter opens and closes by the change of the display.

Figure 5:
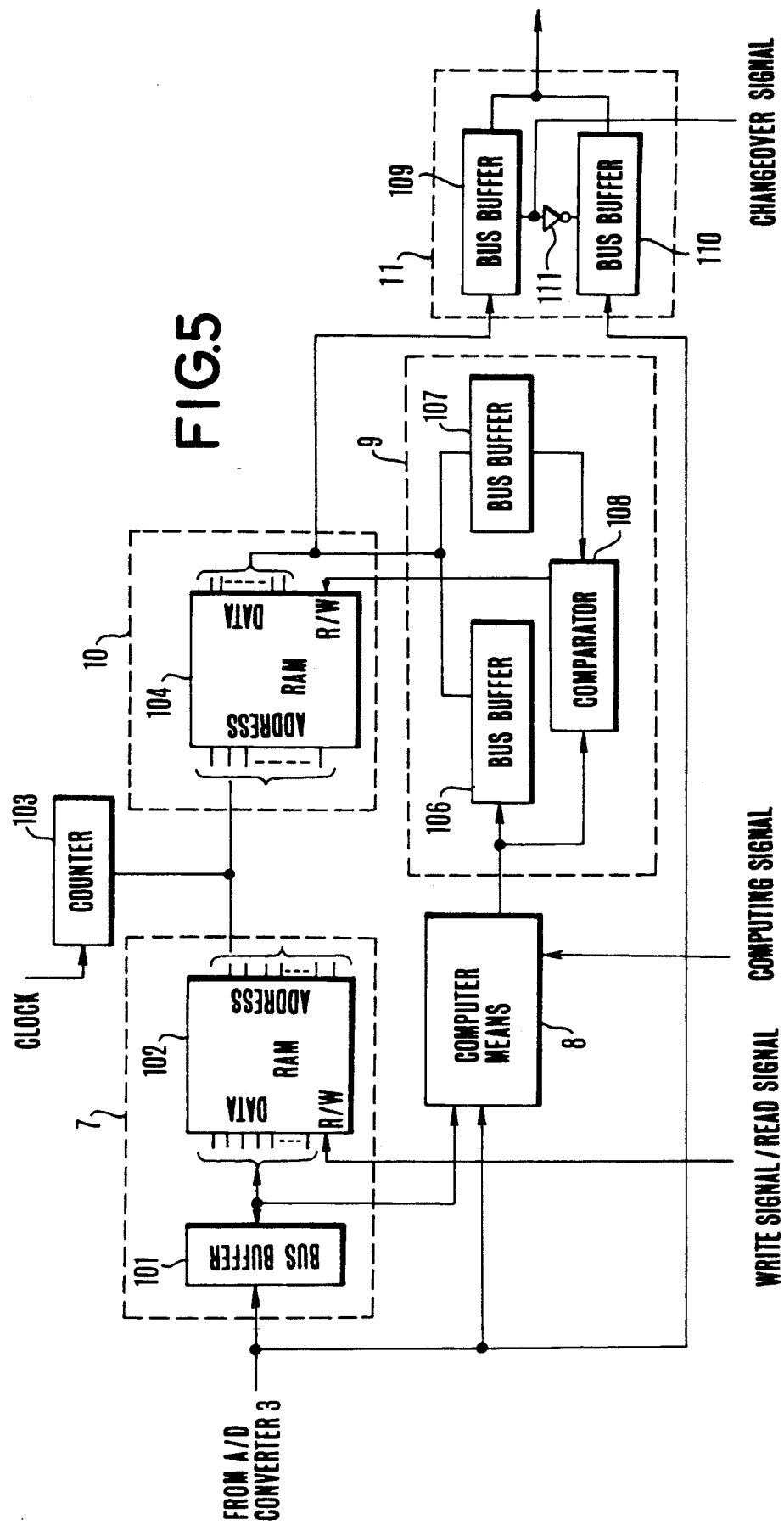
FIG. 5 is a block diagram illustrating an example of the structure of circuitry of main constituent parts in FIG. 1.

FIG. 5 shows a practical example of the structure of the main constituent parts in this embodiment of the invention.

In FIG. 5, a counter 103 counts a train of clock pulses from a clock generation circuit 204 to be described later. Its output becomes an address for RAMs 102 and 104 constituting the first and second memory means 7 and 10 respectively. Since this clock is pulsated in synchronism with the output of the A/D converter 3, the positions of the picture elements of the CCD 1 corresponds to the addresses in one-to-one relation.

Bus buffers 106 and 107 latch respectively the output of the computer means 8 and the data output of the RAM 104.

At first, in the RAM 104, the areas for picture element data are blank. As the exposure starts, the data are successively written in. The data first brought in the RAM 104 are applied to the bus buffer 107, while the outputs of the computer means 8 whose addresses are in correspondence are held in the bus buffer 106. These data are then compared with each other by a magnitude comparator 108. When the output of the bus buffer 106 is larger than the output of the bus buffer 107, the data of the same address in the RAM 104 are rewritten by the output data of the bus buffer 106.

Bus buffers 109 and 110 constitute the changeover means 11 and change over the data to be applied to the display means 12 between from the A/D converter 3 through the bus buffer 110 and from the RAM 104 through the bus buffer 109 depending on the changeover signal from the timing generation circuit 4 or the inverted changeover signal by an inverter 111 respectively.

Figure 6:
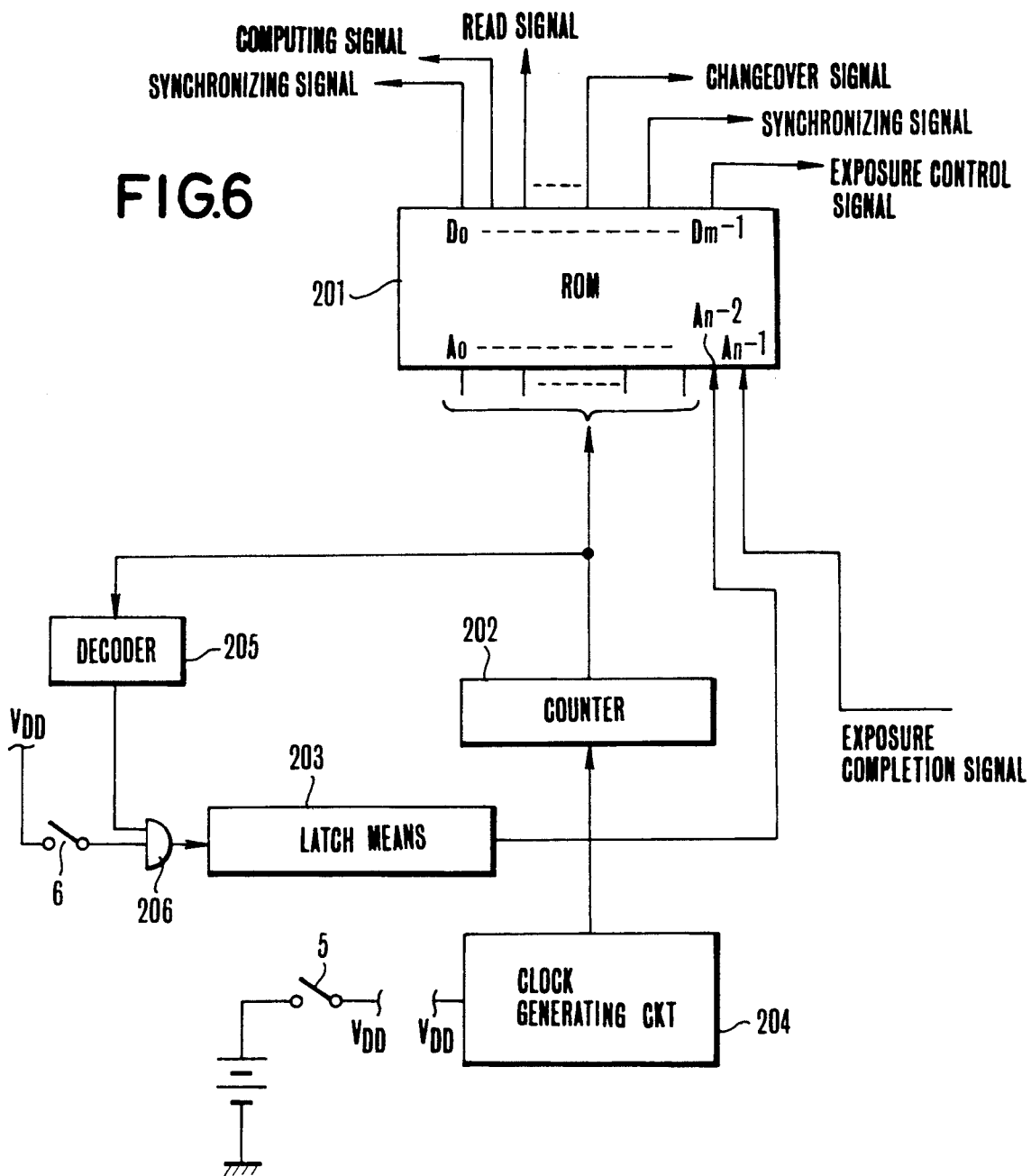
FIG. 6 is a block diagram illustrating an example of the structure of the timing generating circuit 4 in FIG. 1.

FIG. 6 shows the structure of the timing generation circuit 4 in this embodiment of the invention.

In FIG. 6, when the switch 5 turns on, electrical power is supplied to the circuit. The clock generating circuit 204 then produces a train of clock pulses which are counted up by a counter 202. The output of the counter 202, as it stands, is an address of a read only memory (ROM) 201. Timing data written in the ROM 201 are produced from m bit data lines $D_0-D_{m-1}$ in each clock pulse.

Therefore, by writing the timings in the ROM 201, it is made possible to send the timing signals to the CCD driver means 2, the first memory means 7, the changeover means 11 and the driver means 13 for display through the data lines in prescribed timed relationship.

Note here that since an upper significant bit $A_{n-2}$ of the address is connected to the output of latch means 203 for latching the "ON" of the switch 6, it results that after the switch 5 has turned on, the sequence of the addresses of the ROM 201 is repeated across $A_0-A_{n-3}$ until the switch 6 turns on.

Now assuming that the switch 6 turns on, the address is converted to an "ON" signal by a decoder 205. At a point in time when this "ON" signal matches the timing, the "ON" of the switch 6 is detected by an AND gate 206, and latched by the latching means 203. At the same time, an exposure control is started, and the sequence of the addresses $A_0-A_{n-3}$ is recycled likewise as above until an exposure completion signal enters the address $A_{n-1}$. Upon entrance of the exposure completion signal to the address $A_{n-1}$, the addressing of the ROM 201 advances to permit the subsequent operation to occur as the timing signal is produced.

For note, though, in this embodiment, the ROM 201 has been used for generating the timing signals, a modification may be made such that a latch circuit for producing timing pulses suited to each constituent circuit element is combined with a counter so that as the reference pulses generated by the clock generating circuit 204 are counted, the various timings are formed.

Figure 7:
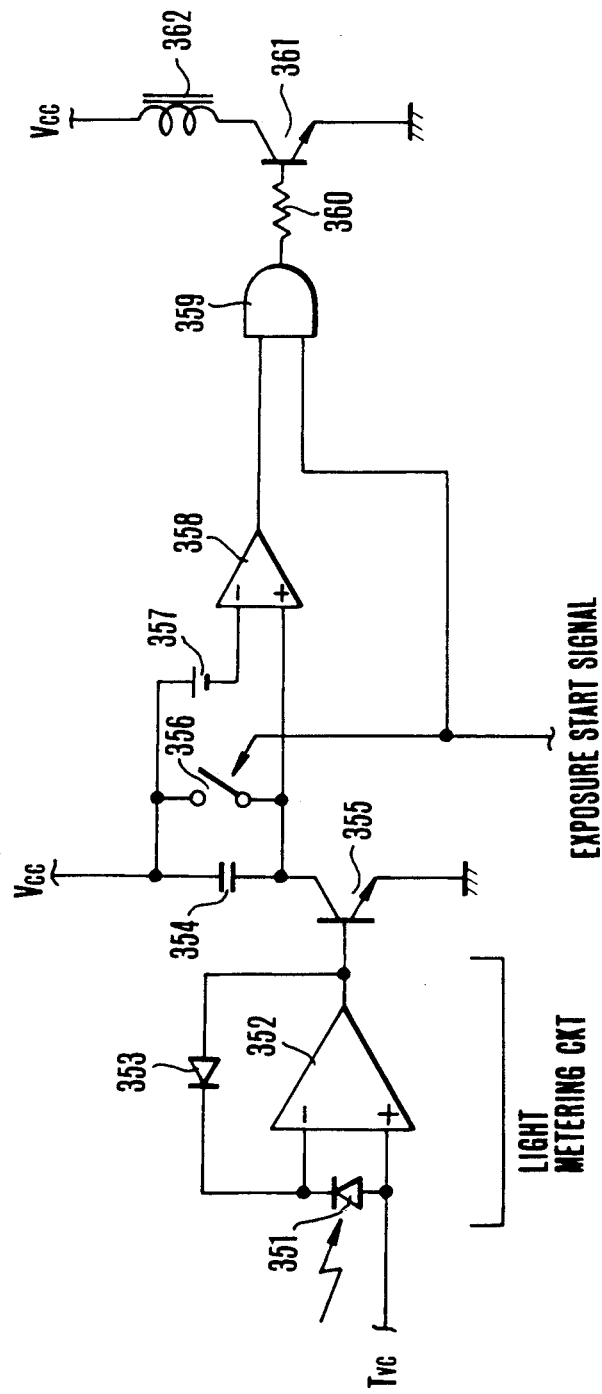
FIG. 7 is a circuit diagram illustrating an example of the structure of the exposure control means 14 in FIG. 1.

FIG. 7 shows the structure of circuitry of the exposure control means 14 in this embodiment of the invention.

In FIG. 7, 351 is a photosensitive element for light measurement or SPC. The photo-current generated in the SPC 351 is converted to a compressed voltage by an operational amplifier 352 and a diode 353 for logarithmic compression. For the photo-current $I_{spc}$, the operational amplifier 352 produces an output represented by $$TVC+(kT/q)ln(I_{spc}/i_0) \tag{1}$$

where TVC is the reference voltage source, k is Boltzmann's constant, T is the absolute temperature, q is the charge of electron and $i_0$ is the backward saturation current of the diode 353.

The output voltage of the operational amplifier 352 enters the base of a transistor 355 for expansion. Letting the collector current be denoted by Ic, we have the following equation:

$$(kT/q)ln(Ic/i_0) = TVC+(kT/q)ln(I_{spc}/i_0) \tag{2}$$

If TVC is made proportional to kT/q, or equal to $(kT/q)lnTVC'$, the equation (2) can be rewritten as follows:

$$(kT/q)ln(Ic/i_0) = (kT/q)ln(I_{spc}xTVC'/i_0) \tag{3}$$

Hence $$Ic = TVC'xI_{spc} \tag{4}$$

From the foregoing, a TVC'-multiplied photo-current flows to the collector of the transistor 355.

When the exposure starts, a switch 356 turns off to permit a timing capacitor 354 to be charged with the collector current of the transistor 355. For note, Vcc is an electrical power source of the circuit.

The voltage stored on the timing capacitor 354 is compared with the reference voltage 357 by a comparator 358. When it exceeds the reference voltage 357, the comparator 358 changes its output from high to low level. An AND gate 359 produces an output of high level from the timing of start of the exposure until the output of the comparator 358 becomes low level, which is applied through a resistor 360 to control a transistor 361 for energizing a coil 362. By this coil 362, a shutter (not shown) is controlled so that a proper exposure is obtained.

Figure 8:
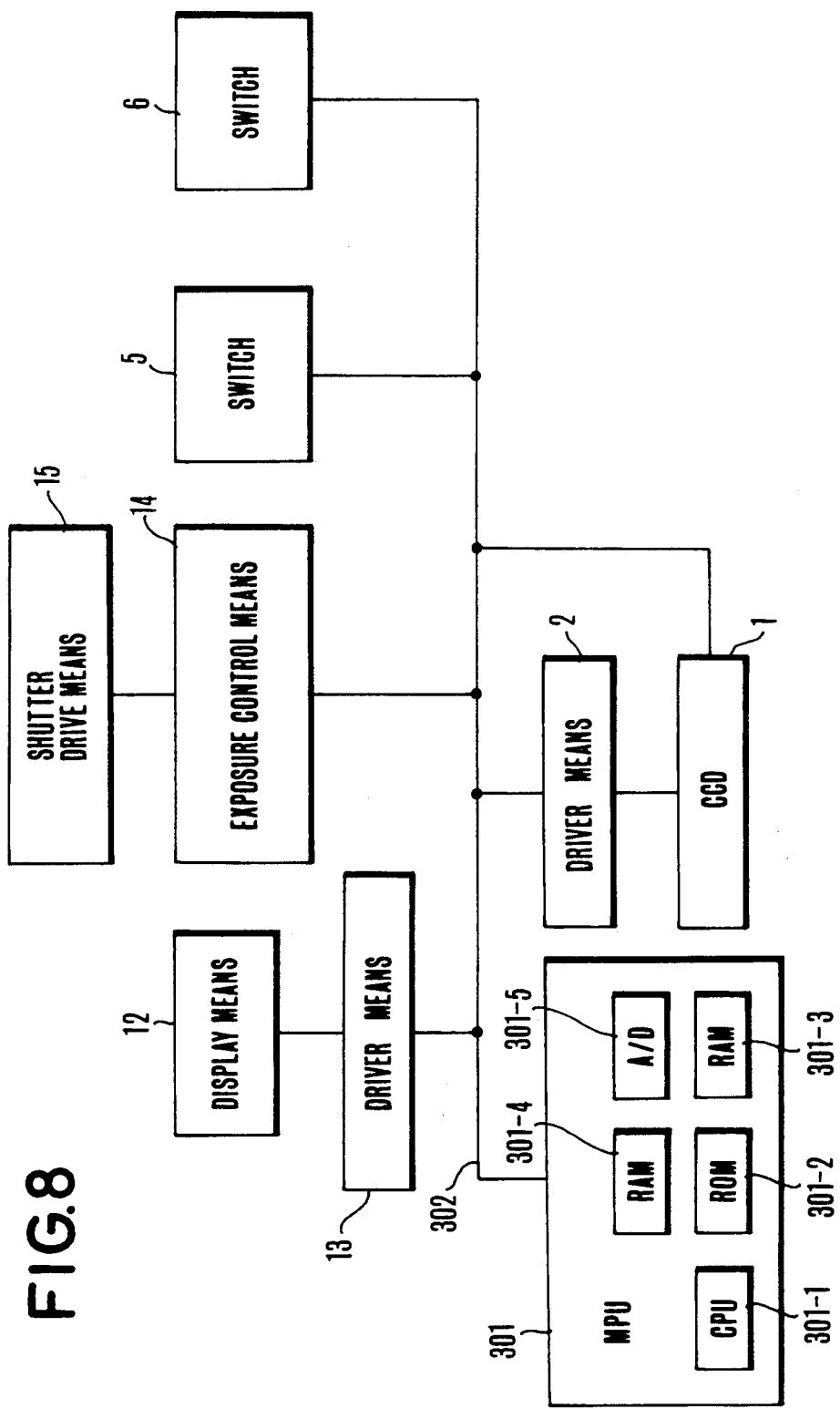
FIG. 8 is a block diagram illustrating an example of another circuit structure of the first embodiment.

FIG. 8 shows another arrangement of this embodiment.

This arrangement exemplifies the utilization of a microcomputer 301 as the timing generation circuit 4, discrimination means 9 and changeover means 11.

For note, the similar parts to those of FIG. 1 are denoted by the same reference characters.

Figure 9A:
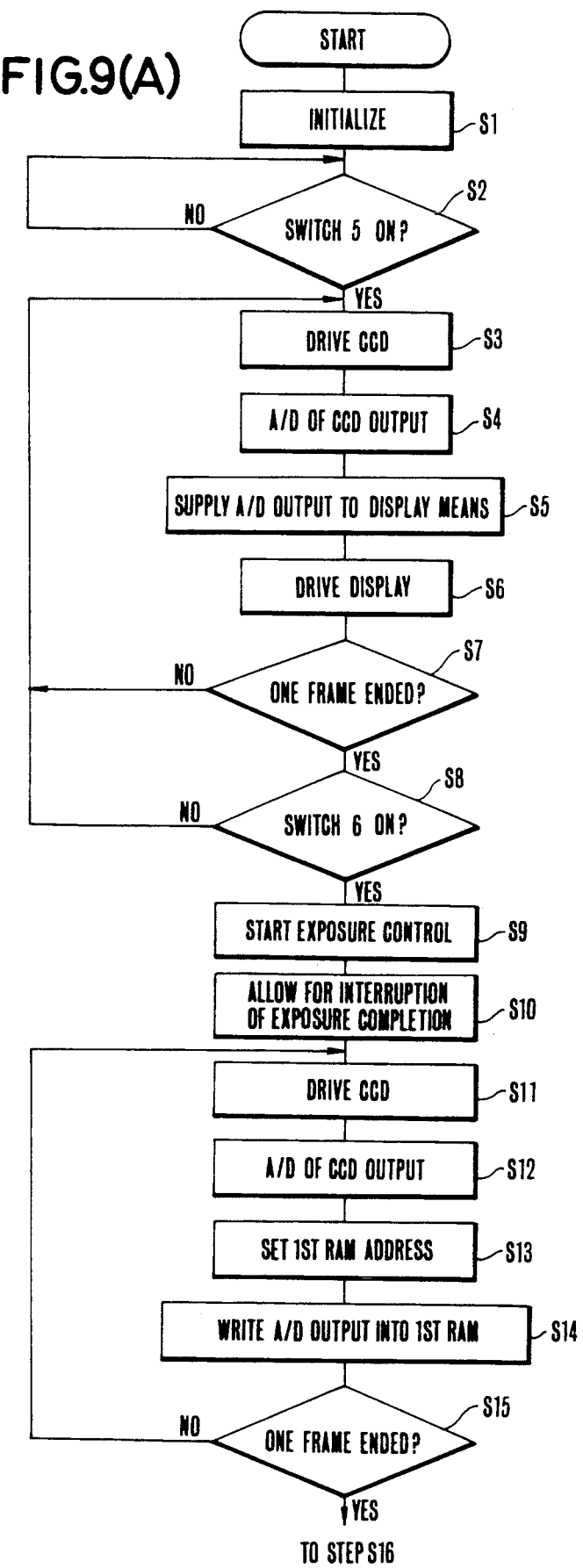
FIG. 9(A), 9(B), 9(C) are flowcharts illustrating a program for control of the MPU 301 in FIG. 8.
Figure 9B:
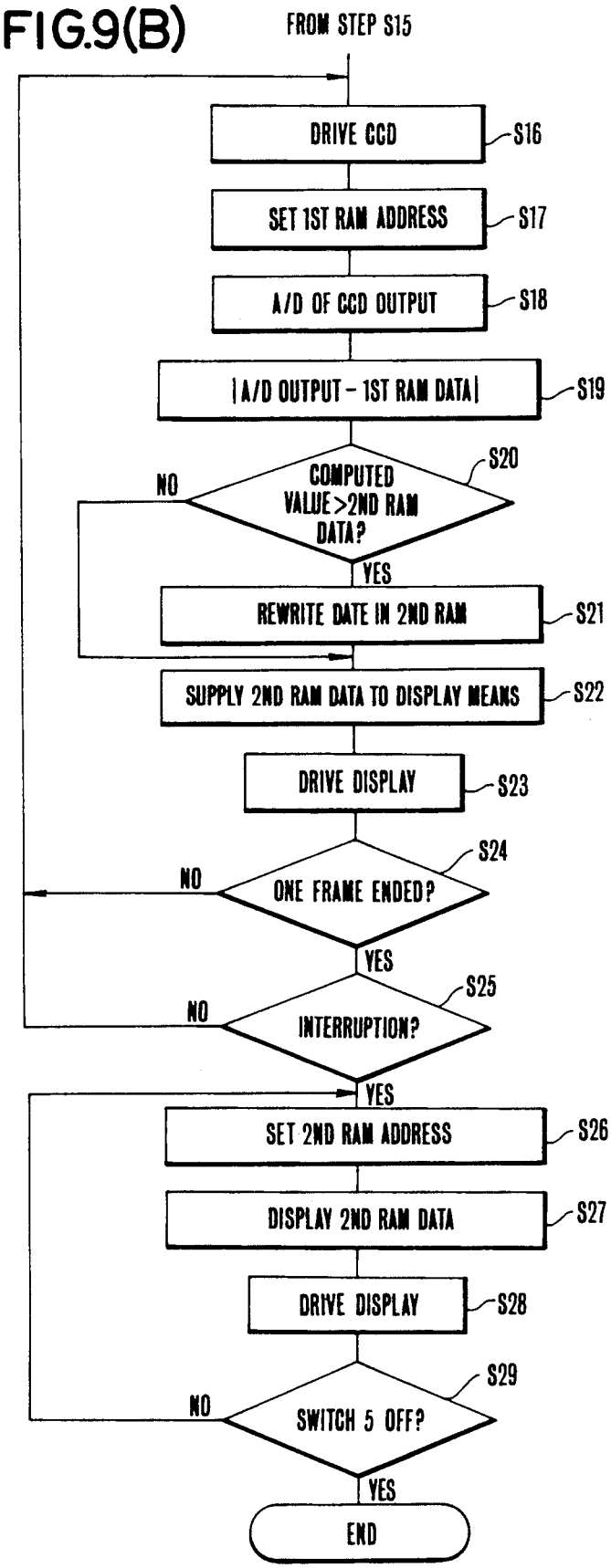
Figure 9C:
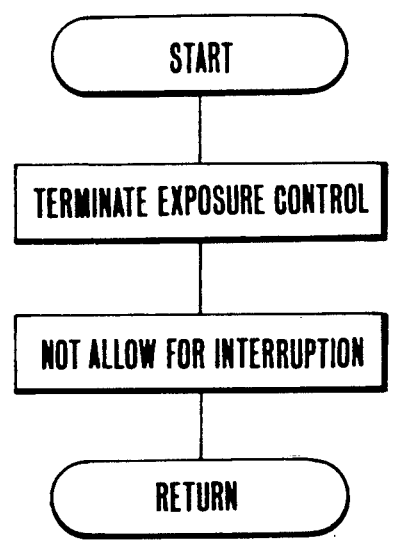

In FIG. 8, the microcomputer (MPU) 301 carries out not only the program for control shown in FIGS. 9(A)–9(C) but also controls concerning a photographic shot. The MPU 301 includes a computation unit (CPU) 301-1, a read only memory (ROM) 301-2, random access memories (RAM) 301-3 and 301-4, and an analog-to-digital converter (A/D converter) 301-5.

The ROM 301-2 contains the control program shown in FIGS. 9(A)–9(C). The RAMs 301-3, 301-4 store variables to be used in this control program and the image data picked up by the CCD 1.

302 is a system bus for transmitting information from each circuit element.

FIGS. 9(A)–9(C) show an example of the control program of the MPU 301 of FIG. 8.

In FIG. 9(A), when the electrical power source of the camera body is turned on, the RAMs 301-3, 301-4 as the first and second memory means are cleared, and the other circuit elements are cleared (step S1).

Having waited for the photographer to turn on the switch 5, the CCD 1 is driven (steps S2–S3).

The analog image signal produced from the CCD 1 is converted to a digital form by the A/D converter 301-5 and applied to the display means 12 (steps S4–S5). After that, the display driver means 13 is actuated, causing the display means 12 to display the image (step S6).

Such a procedure is repeated until the photographer turns on the switch 6.

On the display means 12, therefore, the image formed on the CCD 1 is displayed as it is.

Next, when the photographer pushes the switch 6, the MPU 301 sends the exposure start signal to the exposure control means 14, thereby the shutter drive means 15 is actuated (steps S8–S9).

Then, the MPU 301 allows for the exposure completion signal from the exposure control means 14 to interrupt into the control sequence. For note, when the MPU 301 receives the exposure completion signal from the exposure control means, it executes a control program shown in FIG. 9(c), and terminates the exposure control, thereby the interruption of the signal from the exposure control means 14 is hindered (step S10).

In a step S11, it drives the CCD 1, and the image information obtained from the CCD 1 is converted to a digital form by the A/D converter 301-5. This digitized image data for one frame are written in the storage area of the first memory means or RAM 301-3, while its image position is in correspondence (steps S11–S15).

When the memorizing of the image data by one frame is complete, the output of the next one picture element of the CCD 1 is A/D converted and brought in the CPU 301-1 (steps S16–S18). Then, the difference between this A/D output and the image data of the corresponding image position stored in the RAM 301-3 is computed (step S19).

In a step S20, the difference data stored in the second memory means or RAM 301-4 at the corresponding image position is read out, and this stored difference data is compared with the computed difference data in the step S19.

When the computed difference data is larger than the stored difference data, this computed difference data is used as the new difference data to be stored, and the old stored difference data is rewritten (step S21).

When the computed difference data is smaller than the stored difference data, the rewriting of the difference data is not carried out, and the flow advances to a step S22. In the step S22, the image data of the RAM 301-4 is given to the display means 12. In the next step S23, that image data is displayed on the display means 12.

The foregoing sequence of operations (steps S16 to S23) is repeated over all the image data for one frame produced from the CCD 1. For note, if, in this stage of the program, there is the interrupt signal representing the termination of the exposure from the exposure control means 14 as shown in FIG. 8, the flow advances to a step S26. If not so, as it implies that the shooting is in progress, the MPU 301 continues repeating the display treatment (steps S16–S25) of the stored difference data in the RAM 304-4. In the case of a long exposure time, therefore, the user can see what result the hand shake effects during shooting. With this, when the hand shake is large, the user may also give up the shooting or can even stop halfway such an exposure by turning off the switch 6.

When the exposure is complete, the CCD 1 no longer picks up the image. But, the difference data stored in the RAM 304-4 is only displayed until the photographer turns off the switch 5 (steps S26–S29). When the switch 5 turns off, the execution of this control program ends.

Though, in this embodiment, use has been made of two separate elements for storing the reference image and the above-described difference data to be compared, namely, RAM 301-3 and RAM 301-4, one and the same RAM may be used provided that it has two storage areas for them.

Also, when the display means 12 is of the light emitting (EC), strong electrical liquid crystal or other memory-effect type, the display means 12 and the second memory means 10 can be formed to a common member.

Further, in the case of the display driver means 13 having a buffer for temporarily storing information to be displayed, the second memory means 10 and this buffer may be formed to a common member, as a matter of course.

Furthermore, the influence by the hand shake, that is, the data representing the difference between the image luminance picked up at the present time by the CCD 1 and the stored image luminance in the first memory means can be displayed with a weight by adding certain data to the second memory means followed by re-memorization, as a matter of course.

Next, a second embodiment of the invention is shown.

The outer appearance of this embodiment is similar to that shown in FIG. 2. So, its explanation is omitted here.

Figure 10:
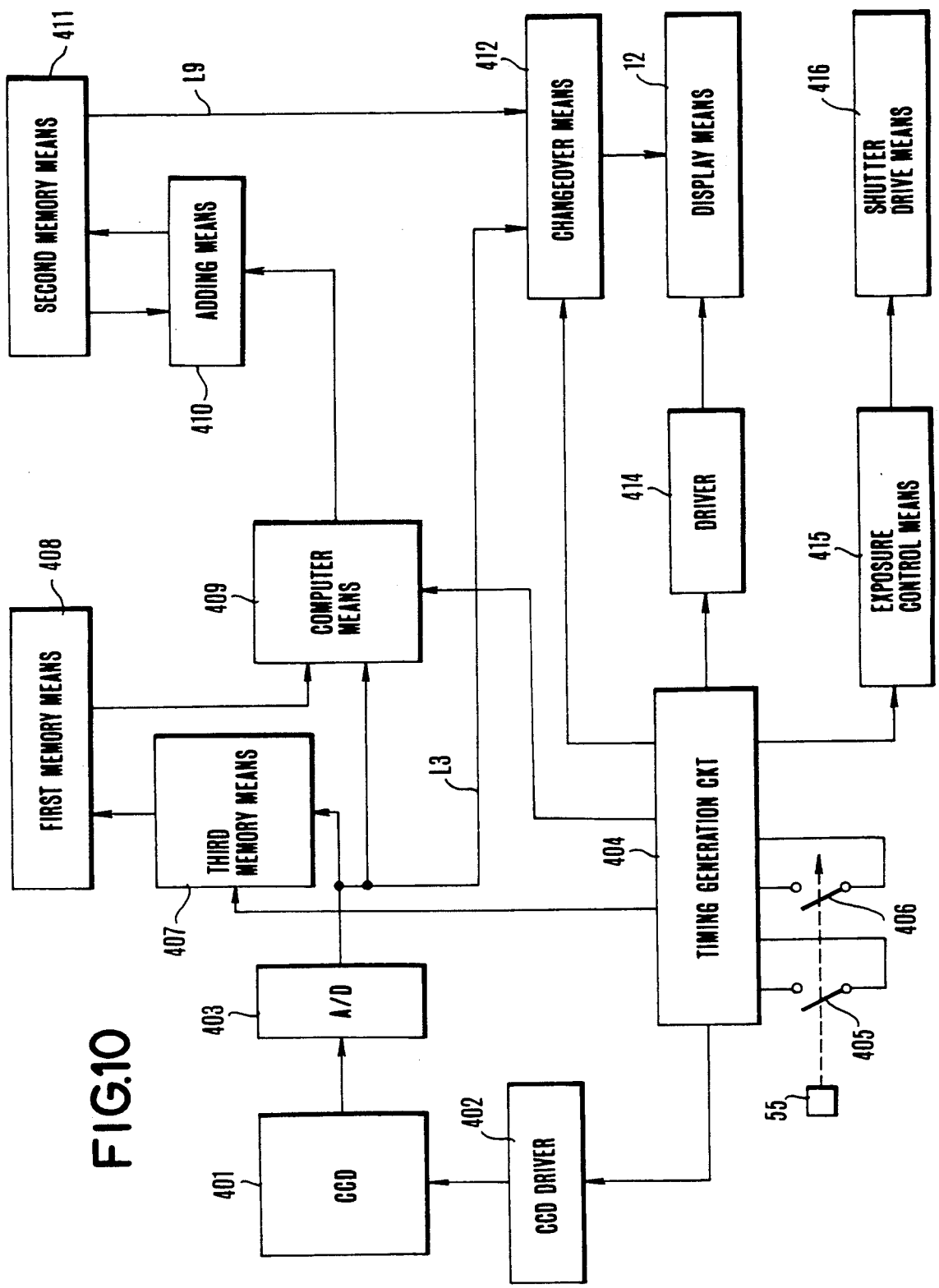
FIG. 10 is a block diagram illustrating an example of the arrangement in a second embodiment of the invention.

FIG. 10 shows an example of the arrangement in this embodiment.

In FIG. 10, a light receiving element 401, because of its being used in the electronic view finder, is in the form of a solid state image pickup element (CCD). A CCD driver 402 drives the CCD 401. The image signal from the CCD 401 is converted from the analog form to a digital form by an A/D converter 403.

A timing generation circuit 404 controls the drive timing of each unit concerning this embodiment. A switch 405 operates in response to the release button 55 shown in FIG. 2, and turns on by the first stroke. Another switch 406 turns on when the release button 55 is further pushed down to the second stroke. When the photographer turns on the switch 406, an exposure operation onto the film surface 53 is started.

Third memory means 407 temporarily stores the output of the A/D converter 403. The data stored in the third memory means 407 are transferred to and stored on first memory means 408.

Computer means 409 computes the difference between the data of the first memory means 408 and the output of the A/D converter 403 (or the brightness difference) and produces an output representing the absolute value of the difference which is applied to adding means 410. The adding means 410 adds the data stored in second memory means 411 and the data produced from the computer means 409 and rewrites the data in the second memory means 411 by using the addition result as the summed difference data.

Changeover means 412 receives the outputs of the second memory means 411 and the A/D converter 403 and places either one of them on the output thereof. 12 is the display means shown in FIG. 2 for displaying the data produced from the changeover means 412. A driver 414 controls the display of the display means 12. Exposure control means 415 controls the exposure of the film surface 53 of FIG. 2. In response to the exposure control means 415, the shutter blades are driven by shutter drive means 416.

The operation in this embodiment is next described by reference to the timing chart of FIG. 11. This embodiment is that the change of the picked up position of the object image resulting from the hand shake, or the sum of the differences between successive two of the outputs for frames of the CCD 401 is displayed as the degree of hand shake on the display means 12.

Figure 11:
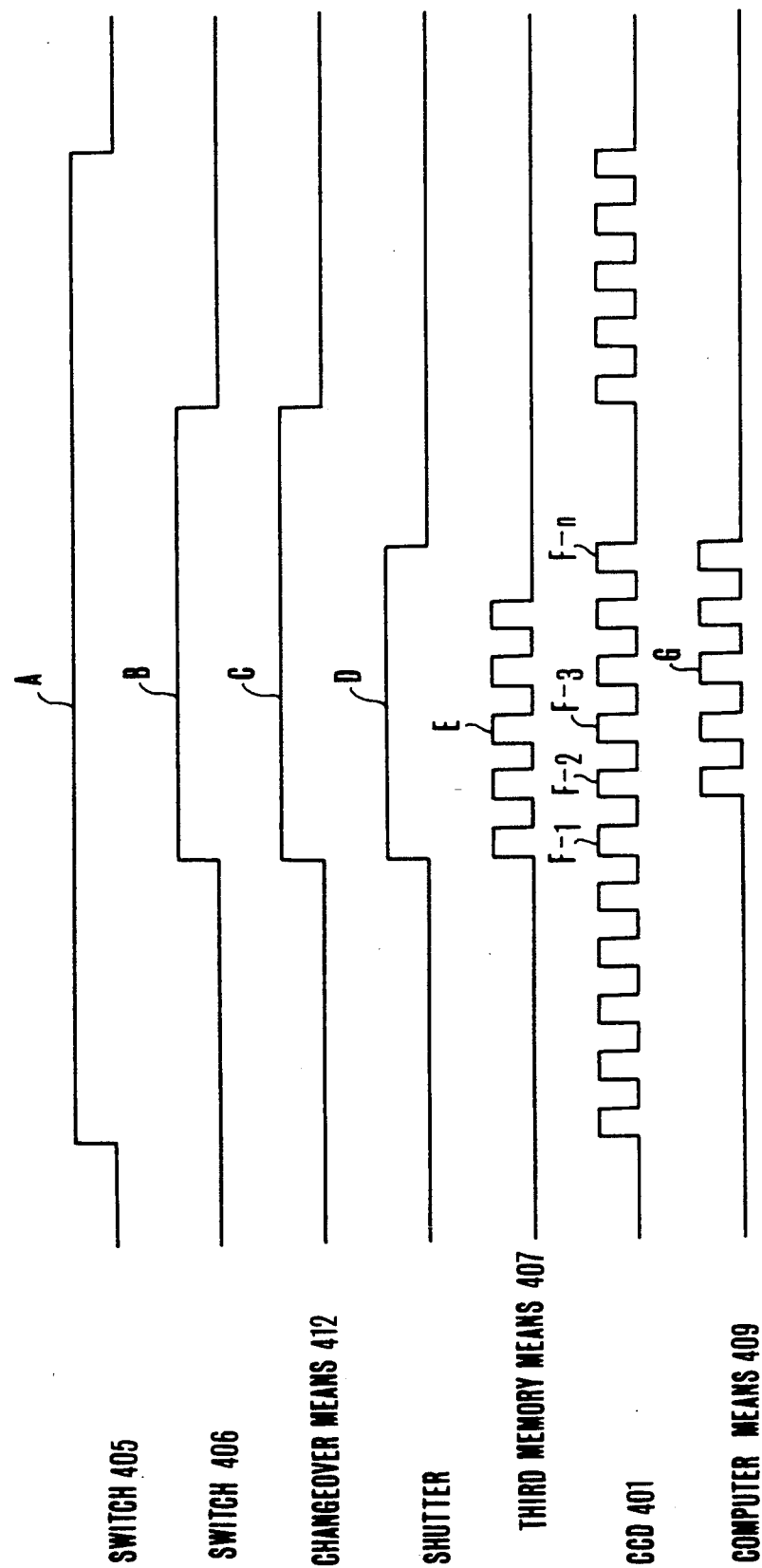
FIG. 11 is a timing chart illustrating a manner in which the arrangement of FIG. 10 operates.

In FIG. 11, when the switch 405 turns on, the switch 405 produces a pulse of waveform A until the switch 405 turns off. Also, each portion of the circuit is supplied with electrical power. The image on the CCD 401 is photo-electrically transduced to an analog electrical signal which is then converted to a digital signal by the A/D converter 403. The digital signal passes through a signal line L3 and the changeover means 412 to the display means 12.

The CCD 401 produces an image signal for every one frame during the time when one pulse occurs as shown in FIG. 11. For note, the output timing of the CCD 401 is controlled by the CCD driver 402 in response to the timing pulse of the timing generation circuit 404. Also, the display means 12, too, is controlled likewise by the driver 414 in response to the timing pulse of the timing generation circuit 404.

Then, when the operator turns on the switch 406 to produce a waveform B, the changeover means 412 selects the output of the second memory means 411 to apply it to the display means 12. Since, up to this time, no data have been stored in the second memory means 411, nothing is displayed at this time.

Then, when the switch 406 turns on, a data write signal is produced to the third memory means 407 at a timing of waveform E. Therefore, the image information for one frame photo-electrically converted in one output pulse F-1 from the CCD 401 is stored in the third memory means 407, and therefrom soon transferred to the first memory means 408.

By the next pulse F-2, the frame produced from the CCD 401 is stored in the third memory means 407. At the same time, the brightness difference between the frame stored in the first memory means 408 and the frame produced in the pulse F-2 from the CCD 401 is computed by the computer means 409. The output of the computer means 409 is applied to the adding means 410.

Subsequently the successive frames from the CCD 401 travel through the third memory means 407 and the first memory means 408 to the computer means 409, and the computer means 409 repeats subtraction of the data stored in the first memory means 408 from the data produced from the A/D converter 403 during the time of occurrence of a pulse shown by D determined by the exposure control means 415, or the timing of opening of the shutter.

The adding means 410 adds the data produced from the computer means 409 to the data stored in the second memory means 411 and supplies the sum of data to the second memory means 411. The second memory means 411 stores the sum of data and supplies it to the adding means 410 and to the display means 12 through a signal line L9 and the changeover means 412.

Figure 12:
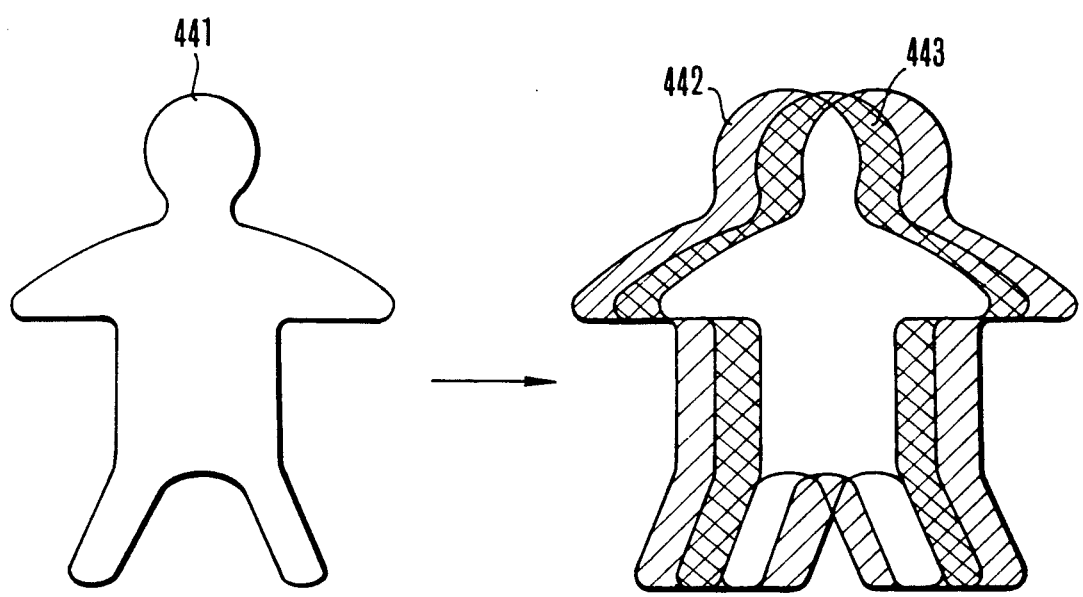
FIG. 12 is pictorial representations illustrating an example of the change of display in the arrangement of FIG. 10.

FIG. 12 schematically shows the image actually displayed on the display means 12.

In FIG. 12, an area 441 represents an image realtimely displayed in a time interval from the "ON" of the switch 405 to the "ON" of the switch 406. Also, at a time when the switch 406 turns on, the displayed image all temporarily disappears from the display frame. Then, if it happens that the camera moves by the hand shake, the image blur or the part of brightness difference in the same image position is displayed like an area 442 or an area 443.

As the degree of hand shake increases, where the influence of the hand shake is stronger is displayed denser like an area 443 on the display means 12.

Therefore, it becomes possible that the photographer is able to see an image of close state to the picture taken with the hand shake. Also, considering the size of the densely displayed portion, etc. and estimating the influence of the hand shake on the just-taken shot, the photographer can judge whether or not to shoot once more. Therefore, the necessity of shooting the same object twice for each picture is eliminated.

Figure 13:
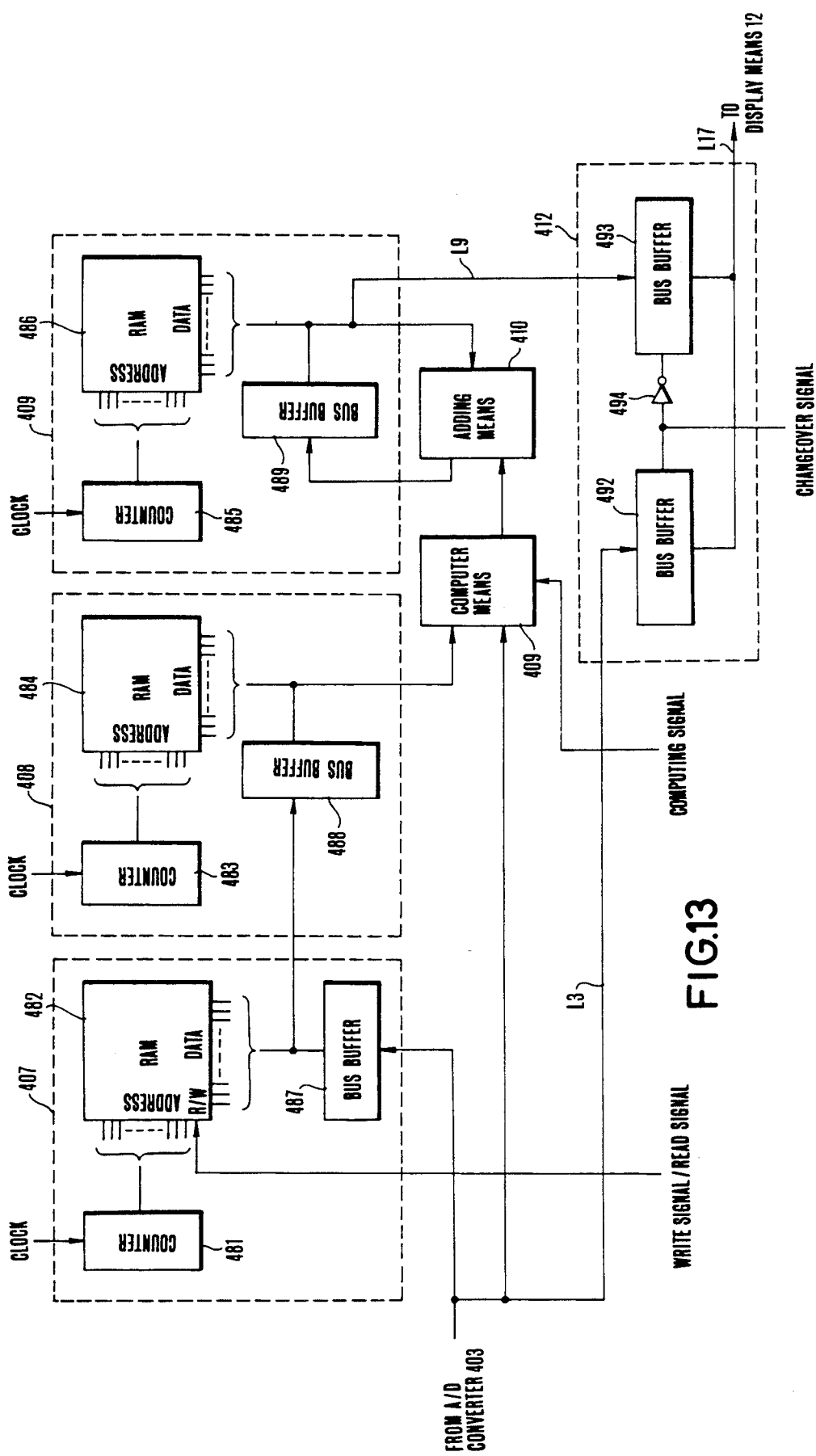
FIG. 13 is a block diagram illustrating an example of the structure of the main constituent portions in FIG. 10.

FIG. 13 shows an example of the circuit structure of the main constituent parts of this embodiment in detail.

In FIG. 13, a clock (synchronizing signal) enters counters 481, 483 and 485 which give the same address to a RAM 482 in the third memory means 407, a RAM 484 in the first memory means 408 and a RAM 486 in the second memory means 409 in phase displaced relation. When an exposure starts, or when the switch 406 turns on, the output for the first picked up frame of the CCD 401 is applied through a bus buffer 487 to the RAM 482 and then through a bus buffer 488 to the RAM 484.

As the next image frame is sent from the CCD 401 through the A/D converter 403, the RAM 482 writes this data and at the same time the RAM 484 gives off the stored data to the computer means 409. The computer means 409 then computes the difference between both data. Its absolute value is given to the adding means 410. The adding means 410 then adds the corresponding data produced from the RAM 486 to the image position and the output of the computer means 409. Its output is applied to the bus buffer 489. And, the corresponding data in the RAM 486 are rewritten by the added data.

For note, for the adding means 410, by considering an event that the computed value overflows, the output it produces may be limited to the maximum value of the data the second memory means 409 can store.

The changeover means 412 with the bus buffer 492, the bus buffer 493 and an inverter 494 brings the signal line L3 into connection with a signal line L17 when the output of the A/D converter 403 is given to the display means 12, or the signal line L9 into connection with the signal line L17 when the output of the second memory means 411 is given to the display means 12.

For note, the timing generation circuit 404 and the exposure control means 415 of FIG. 10 are similar in construction and arrangement to those shown in FIGS. 6 and 7. So their explanation is omitted.

Figure 14:
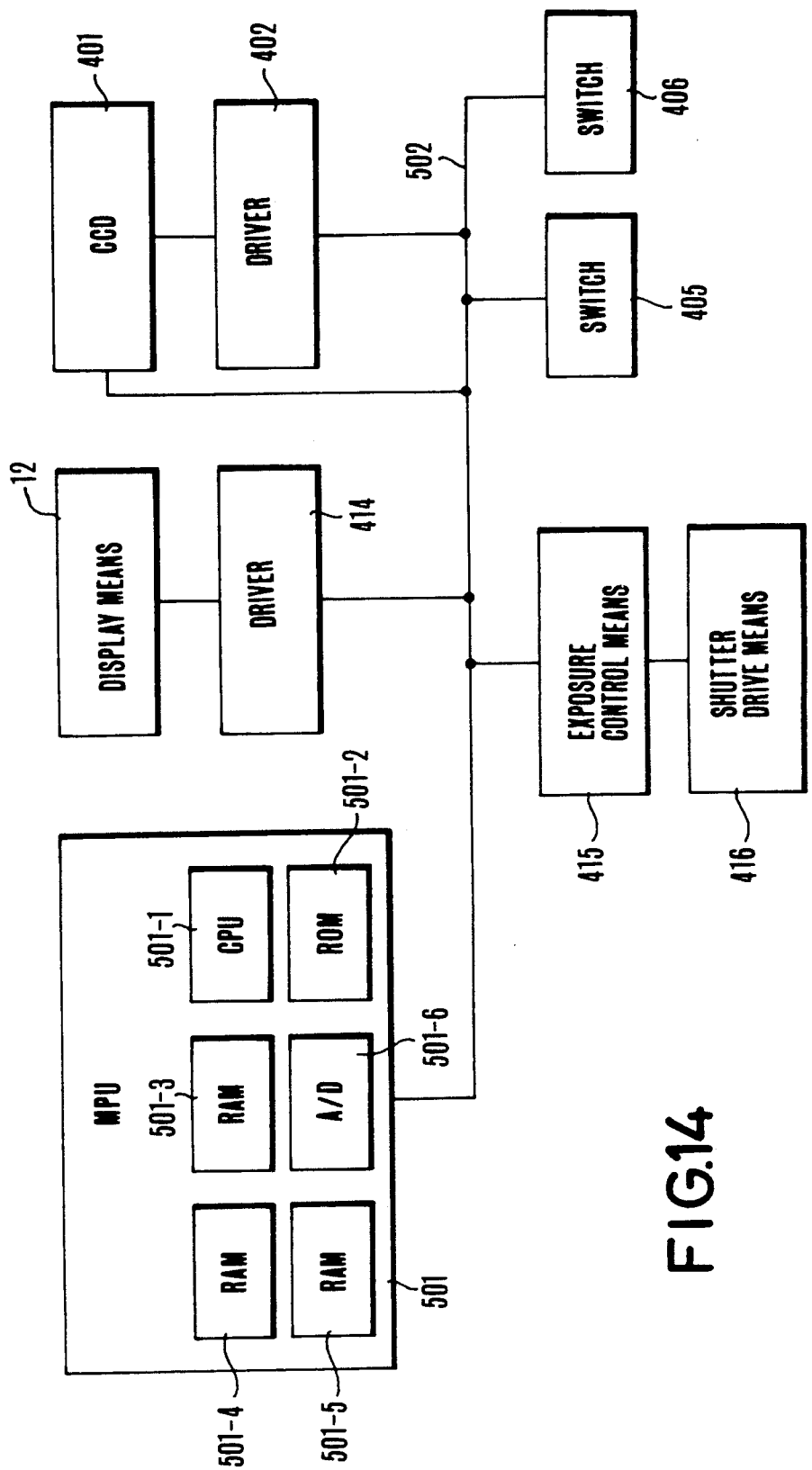
FIG. 14 is a block diagram illustrating an example of another arrangement of the second embodiment.

FIG. 14 shows another example of the arrangement of this embodiment. In this example of the arrangement, as the timing generation circuit 404, computer means 409, adding means 410 and changeover means 412 use is made of a microcomputer.

For note, the similar parts to those of FIG. 10 are denoted by the same reference characters.

Figure 15B:
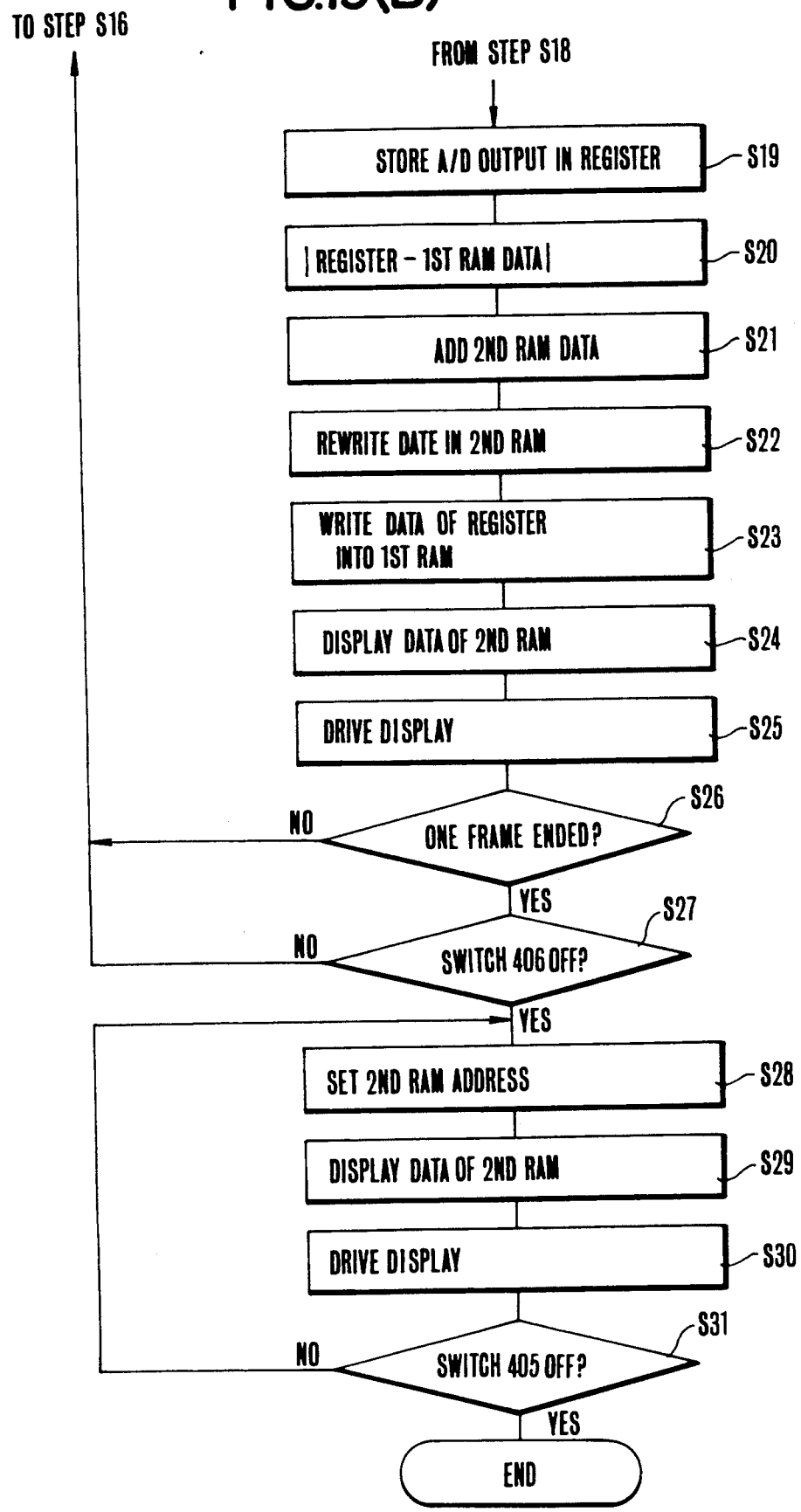
Figure 15C:
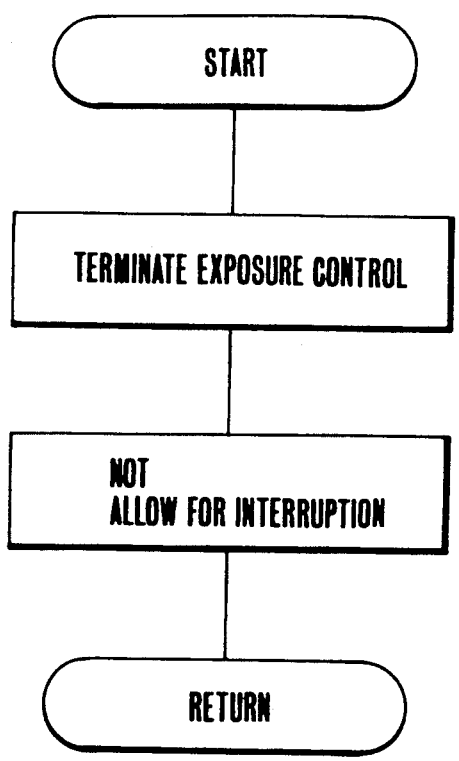

In FIG. 14, the microcomputer (MPU) 501 performs not only the control program shown in FIGS. 15(A)-15(C) but also controls concerning the photographic shot. The MPU 501 includes a computing unit (CPU) 501-1, a read only memory (ROM) 501-2, random access memories (RAMs) 501-3 to 501-5 and an analog-to-digital (A/D) converter 501-6.

The ROM 501-2 contains the control program shown in FIGS. 15(A)-15(C). The RAMs 501-3, 501-4 and 501-5 store variables to be used in this control program and the image data picked up by the CCD 401. The A/D converter 501-6 converts the inputted analog signal representing the picked up image data to a digital signal which is then applied to the CPU 501-1. A system bus 502 transmits information from each unit therethrough.

FIGS. 15(A)-15(C) show an example of the control program for the MPU 501 of FIG. 14.

In FIG. 15(A), when the electrical power source in the camera body is thrown, the CPU 501-1 clears the RAMs 501-3 to 501-5 and initializes all the other constituent parts (step S1).

Then, when the photographer turns on the switch 405, the MPU 501 drives the CCD 401. The A/D-converted image data produced from the CCD 401 is then brought in the CPU 501-1, and then outputted to the display means 12. The display driver 414 drives the display means 12 to display the picked-up image data (steps S2-S6). Such a procedure (steps S2-S8) is repeated until the photographer turns on the switch 406.

When the photographer turns on the switch 406, the MPU 501 sends an exposure start signal to the exposure control means 415. Upon reception of this exposure start signal, the exposure control means 415 actuates the shutter drive means 416 on the basis of the preset value of shutter time (step S9). At this point in time, the exposure is started.

Then, the MPU 501 allows for interruption of an exposure completion signal from the exposure control means 415. For note, when the MPU 501 receives the exposure completion signal from the exposure control means 415, it performs a control program shown in FIG. 15(C) to terminate the exposure operation, and then hinders interruption of the signal from the exposure control means 415 (step S10).

In steps S11 and S12, the MPU 501 accepts the outputted image from the CCD 401 and writes it in the RAM 501-3 which corresponds to the first memory means of FIG. 10 (step S14).

When the CPU 501-1 has completed the writing of the image data for one frame in the RAM 501-3, the CCD 401 is driven again. The image data for the next frame which follows after a prescribed interval is brought in the MPU 501 and stored for a while in a register within the CPU 501-1. Then, the difference between this image data and the image data of the corresponding image position stored in the RAM 501-3, or the degree of hand shake, is computed (steps S16-S20).

Then, the computed result is added to the stored data of the RAM 501-4 which corresponds to the second memory means of FIG. 10. This added result is written again in the RAM 501-4 (steps S21-S22).

Then, the image data stored in the register of the CPU 501-1 is written in the RAM 501-3, and the data of the total sum of the differences stored in the RAM 501-4 is displayed on the display means 12 (steps S24-S25).

Such a procedure is repeated until the display of one frame of the data of the total sum of the difference is complete (steps S16-S26). For note, though, in this arrangement, the display of the degree of hand shake is made to continue being presented until the photographer turns off the switch 406 as it implies that the shooting is going on, the display of the degree of hand shake may otherwise be stopped on the basis of the exposure completion signal.

When the switch 406 turns off, the information representing the total sum of the differences stored in the RAM 501-4 is displayed on the display means 12 until the switch 405 turns off (steps S28-S30). For note, the steps S2-S7 may otherwise be repeated to display the object image. When the switch 405 turns off, as it implies that the shooting for one photograph is complete, this control program ends. Subsequently, each time one shot is taken, the above-described control program is executed to permit the photographer to be able to see its degree of hand shake by looking at the display means 12.

Figure 16:
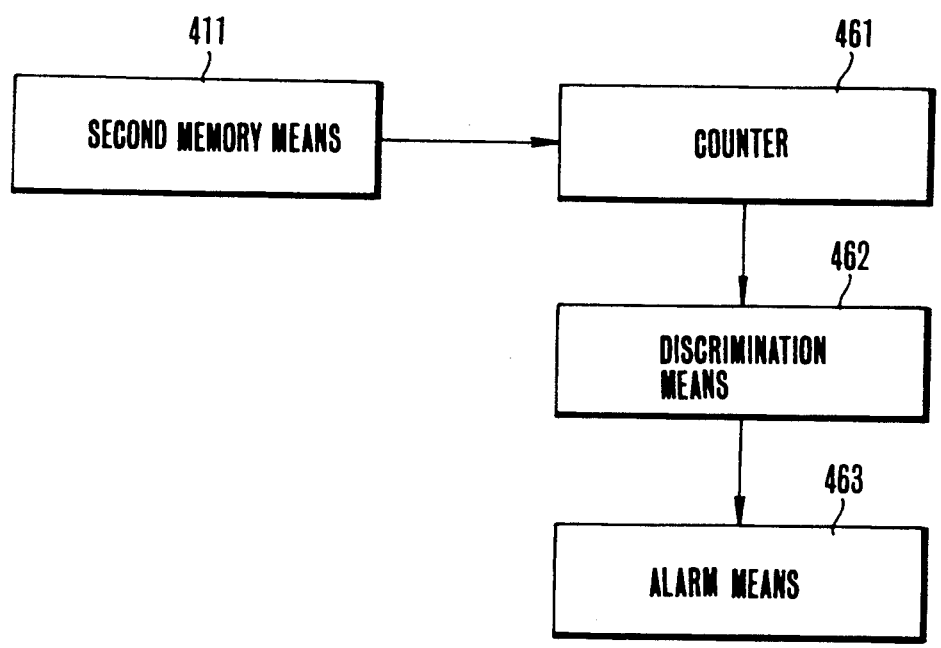
FIG. 16 is a block diagram illustrating an example of the arrangement of the example of adding a warning function to the second embodiment.

FIG. 16 shows an example of modification with addition of alarm means to the invention.

Discrimination means 462 utilizes a comparator. The output of the second memory means 411 of FIG. 10 is applied to a counter 461 to compute the total sum of the degrees of hand shake (the data of the total sum of the differences). This data of the total sum is compared with a predetermined alarm reference value. When the above-described total sum data has exceeded the alarm reference value sensed by the discrimination means 462, its detection signal from the discrimination means 462 is received by alarm means 463 for producing, for example, alarm sound. For note, if the discrimination means 462 is otherwise constructed to produce the detection signal when the above-described total sum data is smaller than the reference value, then the alarm means 463 produces an alarm signal representing the acceptance of the shot.

Also, in this embodiment, if, as the output of the CCD 301 changes in frame units, the image data of the even-numbered frame is made to transfer from the A/D converter 403 directly to the second memory means 411 and to be stored therein so that the image data of the odd-numbered frame is obtained, then the third memory means 407 can be omitted. Still another example of modification is that as the memory means use may be made of a dual-port RAM.

Next, a third embodiment of the invention is described.

The outer appearance in this embodiment is similar to that shown in FIG. 2. So, its explanation is omitted.

Figure 17:
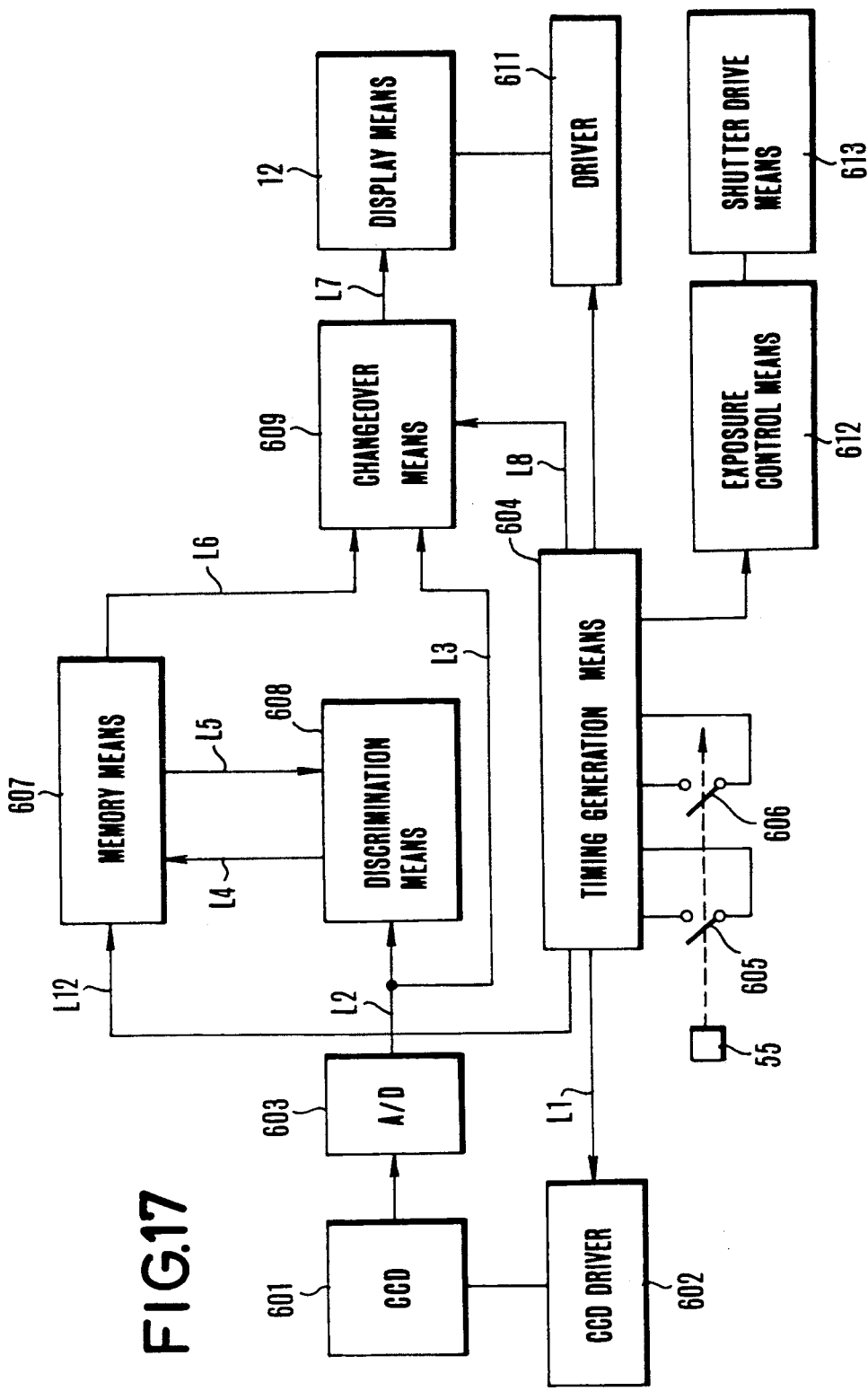
FIG. 17 is a block diagram illustrating an example of the arrangement in a third embodiment of the invention.

FIG. 17 shows an example of the arrangement of this embodiment.

In FIG. 17, a CCD 601 is driven by a driver 602 and photo-electrically transduces an image into an analog signal. An A/D converter 603 converts the analog signal to a digital signal.

A timing generation circuit 604 produces drive timing pulses for the various units concerning this embodiment.

A switch 605 turns on when the shutter release button 55 is pushed to a first stroke. Another switch 606 turns on when the button 55 is further pushed from the first stroke to a second stroke.

When the switch 605 turns on, the image picked up by the CCD 601 is displayed on the display means 12. When the switch 606 turns on, an exposure to the film surface 53 of FIG. 2 is started, and the degree of hand shake is displayed on the display means 12.

Memory means 607 is constructed with, for example, a random access memory (RAM) for storing a shot frame (one-frame image information). Discrimination means 608 compares the image information (brightness information) stored in the memory means 607 with the present image brightness data sent from the CCD 601 through the A/D converter 603 and selects the brighter one out of the image data to rewrite the image data stored in the memory means 607.

Changeover means 609 selects either one of the outputs of the memory means 607 and the A/D converter 603 for application to the display means 12 depending on the indication from the timing generation circuit 604.

A driver 611 drives and controls the display means 12. Exposure control means 612 controls shutter drive means 613 for driving shutter blades.

Next, the operation in this embodiment is described with reference to the timing chart of FIG. 18.

When the shutter release button 55 is pushed down by the photographer to turn on the switch 605 in a timing A as shown in FIG. 18, the image picked up by the CCD 601 is displayed on the display means 12. In more detail, at first, a reference timing pulse is sent from the timing generation circuit 604 through a signal line L1 to the CCD driver 602. In synchronism with this reference timing pulse, the CCD driver 602 drives the CCD 601. The CCD 601 produces an image data of two-dimensional shot area in the one-dimensional form time-serially, which is applied to the A/D converter 603.

For note, the memory means 607 starts to operate when the switch 606 turns on. And, during the interval from the moment at which the switch 605 has turned on to the moment at which the release button 55 is further pushed down to turn on the switch 606, the changeover means 609 selects a signal line L3 to connect with a signal line L7. For this reason, an image to be shot is sent through a path: CCD 601→A/D converter 603→signal line L3 to the display means 12 and real-timely displayed thereon.

Then, when the switch 606 turns on, a changeover signal is sent from the timing generation circuit 604 through a signal line L8 to the changeover means 609. By this changeover signal, the changeover means 609 connects a signal line L6 with the signal line L7.

Also, when the switch 606 turns on, the A/D converter 603 sends this image data through a signal line L2 to the discrimination means 608.

When the discrimination means 608 receives the above-described image data from the A/D converter 603, it sends a read signal through a signal line L4 to the memory means 607 and reads the image data stored in the memory means 607 through a signal line L5. For note, by this read signal, the image data stored in the memory means 607 is sent through a signal line L6 to the changeover means 609 too. Thus, the image is displayed on the display means 12.

The discrimination means 608 compares the image data read out from the memory means 607 with the image data received from the A/D converter 603 in output level (brightness). When the brightness of the image data received from the A/D converter 603 is higher, the discrimination means 608 writes this image data of higher brightness in the memory means 607. This comparison of the image data is carried out for each picture element of the image data sent from the A/D converter 603.

For note, for the first image after the switch 606 has turned on, because there is no stored data in the memory means 607, all of the outputs from the A/D converter 603 are determined to be high by the discrimination means 608. Therefore, the output of the A/D converter 603 is memorized, as it is, in the memory means 607.

In parallelism with this memorizing operation, during the interval of the timing B shown in FIG. 18 from the moment at which the switch 606 has turned on to the moment at which it turns off, the changeover means 609 selects a path: the memory means 607→signal line L6→changeover means 609→signal line L7→display means 12, through which the image data stored in the memory means 607 is sent in each frame to the display means 12 on which the image to be shot is displayed.

Also, during the period of opening the shutter blades determined by the exposure control means 612, that is, the period of timing D shown in FIG. 18, it is made to drive the CCD 601. Therefore, the operation of displaying the high brightness image stored in the memory means 607 is carried out. When a hand shake by the photographer occurs, it results that the high brightness portion in correspondence to the brightness change in each image position is preferentially displayed on the display means 12.

Then, when the switch 606 turns off, the changeover means 609 changes over the signal line connection so that the output of the A/D converter 603 is sent directly to the display means 12. And, upon "OFF" of the switch 605, the driving of the CCD 601 is stopped. Thus, one shot ends.

Next, explanation is made about the hand shake display of the image being shot.

Figure 19A:
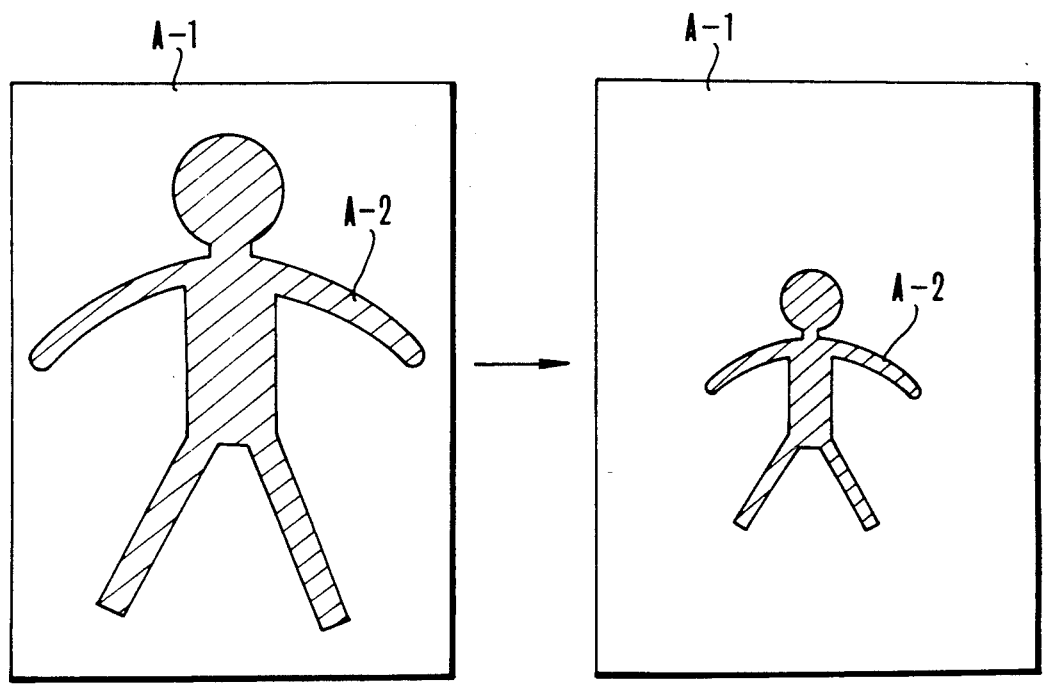
FIGS. 19(A), 19(B) are pictorial representations illustrating an example of display in the arrangement of FIG. 17.

FIG. 19(A) shows an example of the display of an image of an object being photographed with a brighter background or back light.

When the photographer turns on the switch 605, a dim image of a person A-2 as the object to be photographed and a bright image of the background A-1 are displayed. When the photographer turns on the switch 606, the display of the contour portion of the person A-2 goes to change to the video data of the background A-1 of high brightness, so that the contour portion of the person A-2 becomes narrower. Particularly when the hand shake amount is large, the image of the person A-2 disappears from the display area.

Figure 19B:
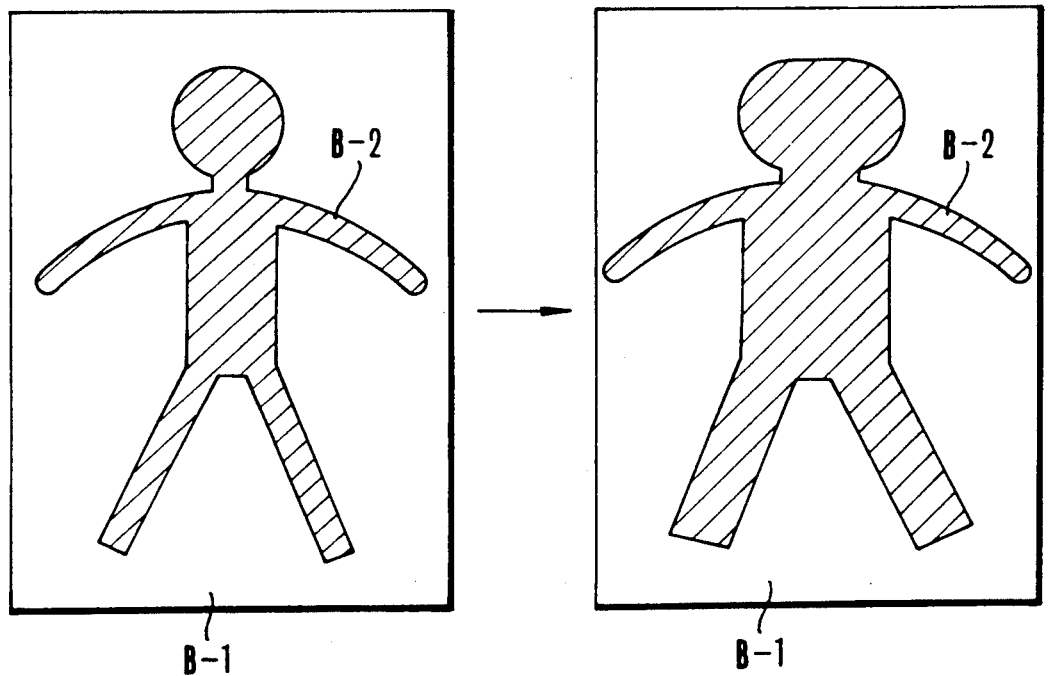

FIG. 19(B) is another example of the display for a dim background B-1 with a person B-2 existing bright. An image of the person B-2 which has been displayed with the switch 605 turned on is, when the switch 606 is turned on, displayed with increasing contours by the hand shake of the photographer. These images are equivalent to the pictures actually taken on the film as is understood from the fact that, in daylight photography, the brighter portion of the scene is predominantly imaged, and, in night photography, the head light of a car becomes like a band. Therefore, the photographer can see the influence of the hand shake on the shot image.

Figure 20:
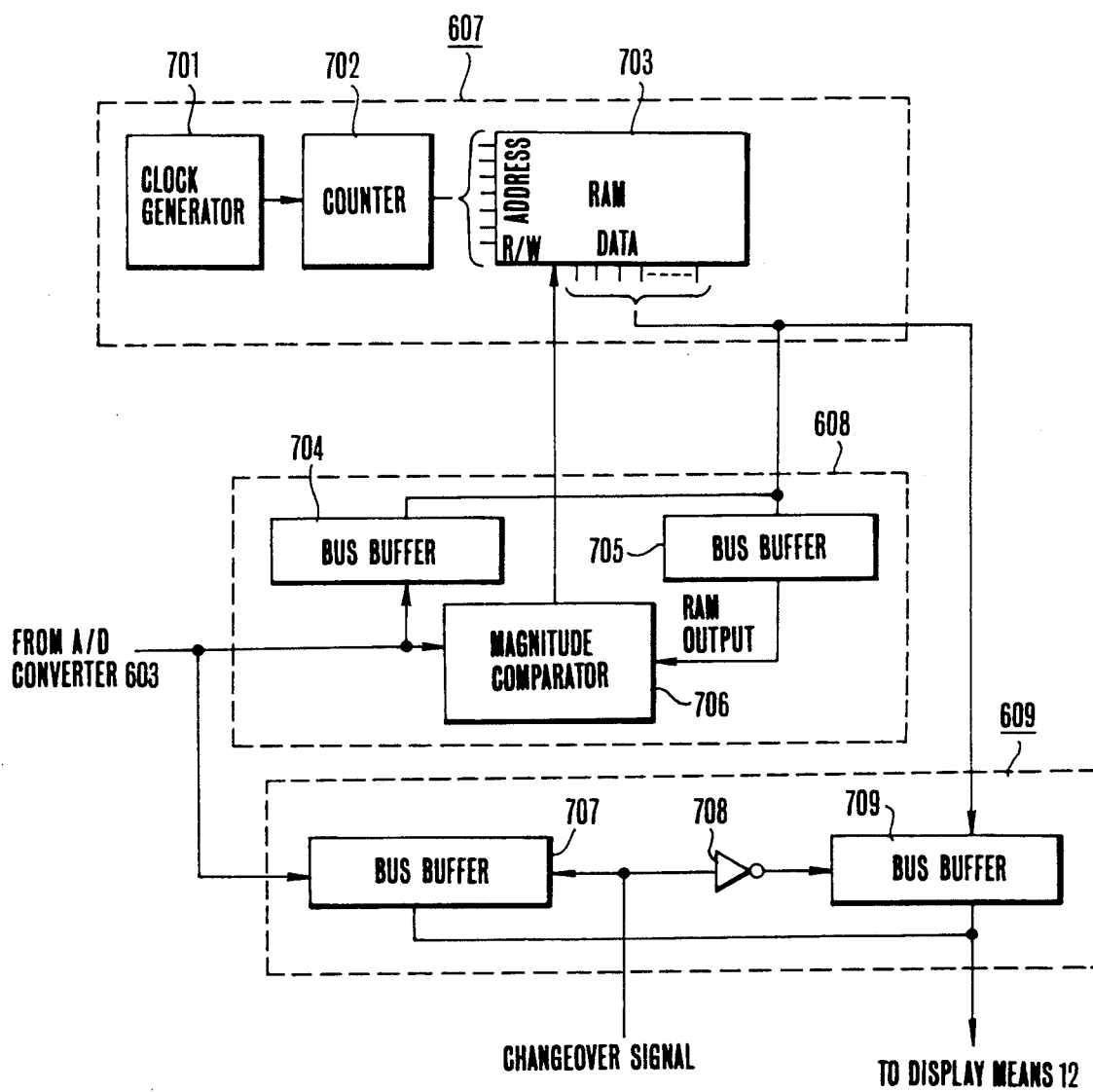
FIG. 20 is a block diagram illustrating an example of the circuit structure of memory means 607, discrimination means 608 and changeover means 609 in FIG. 17.

FIG. 20 shows an practical example of the structure of the memory means 607, discrimination means 608 and changeover means 609.

In FIG. 20, the output of a counter 702 which represents the counting of the output of a clock generator 701 becomes an address for a RAM 703 constituting memory means 607. This clock output is made to change in synchronism with the output of an A/D converter 603. Therefore, the address corresponds to the position of a picture element of the CCD 601.

Bus buffers 704 and 705 latch respectively the output of the A/D converter 603 and the data output of the RAM 703, and change their outputs from the state of high impedance to low level or high level so that the outputs do not overlap each other on the data bus and hold the data.

Up to "ON" of the switch 606, the storage area for image picked up data in the RAM 703 is blank. When an exposure of the CCD 601 starts, the data is rewritten in sequence. The data first taken in the RAM 703 is applied to the bus buffer 705, and the output of the A/D converter 603 in the corresponding address is held in the bus buffer 704. These data are compared with each other by a magnitude comparator 706. When the output of the A/D converter 603 is larger or brighter than the output of the bus buffer 705, the bus buffer 704 is caused to produce its output, and, at the same time, the data of the same address in the RAM 703 is rewritten.

Bus buffers 707 and 709 constitute changeover means 609 responsive to either a changeover signal the timing signal generating circuit 604 indicates or the inverted changeover signal by an inverter 708 for changing over the data to be outputted to the display means 12 between from the output of the A/D converter 603 through the bus buffer 707 and from the data from the RAM 703 through the bus buffer 709.

For note, the timing generation circuit 604 and the exposure control means 612 of FIG. 17 are similar in construction to those shown in FIGS. 6 and 7 respectively. So, their explanation is omitted.

Figure 21:
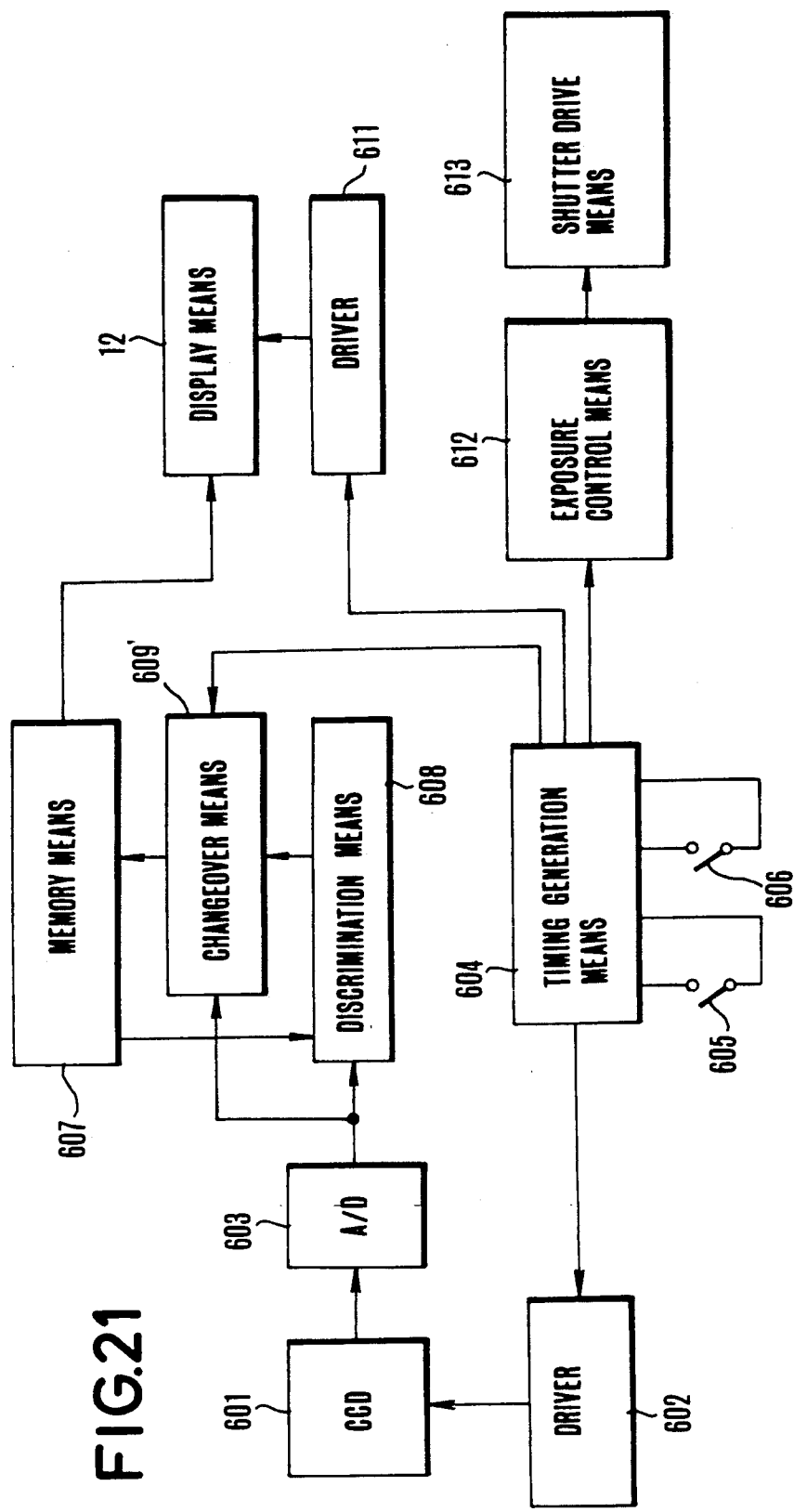
FIG. 21 is a block diagram illustrating another example of the circuit structure of the third embodiment.

FIG. 21 shows another example of the arrangement of this embodiment.

The arrangement of FIG. 21 is obtained by adding to the arrangement of FIG. 17 changeover means 609' in between the memory means 607 and the discrimination means 608. The other parts are similar to those of FIG. 17 and denoted by the same reference characters as those of FIG. 17.

Next, the operation of this arrangement is explained.

During the interval from the "ON" of the switch 605 to the "ON" of the switch 606, the output for each frame of the A/D converter 603 is sent by the changeover means 609' to the memory means 607. Also, in sequence, the video data stored at that time in the memory means 607 is transferred to the display means 12 where an image to be shot is real-timely obtained. Then, when the switch 606 turns on, the shutter opens. During the period of opening the shutter in the timing D (see FIG. 18), the output representing the high brightness sensed by the comparator of the discrimination means 608 is sent by the changeover means 609' to the memory means 607.

For note, in the discrimination means 608, the output of the A/D converter 603 is compared with the one of the video data stored in the memory means 607 which has the same image position, and the data in the memory means 607 is rewritten again by the video data of high brightness.

Since, in the display means 12, the video data stored in the memory means 607 continues being displayed, an equivalent image display to the shot image on the film is obtained.

If the timing is so set that the stored data in the memory means 607 is not rewritten during the time from the closure of the shutter to the "OFF" of the switch 606, the photographer is able to see the shot image and the influence of the hand shake thereon until the switch 606 turns off.

Figure 22:
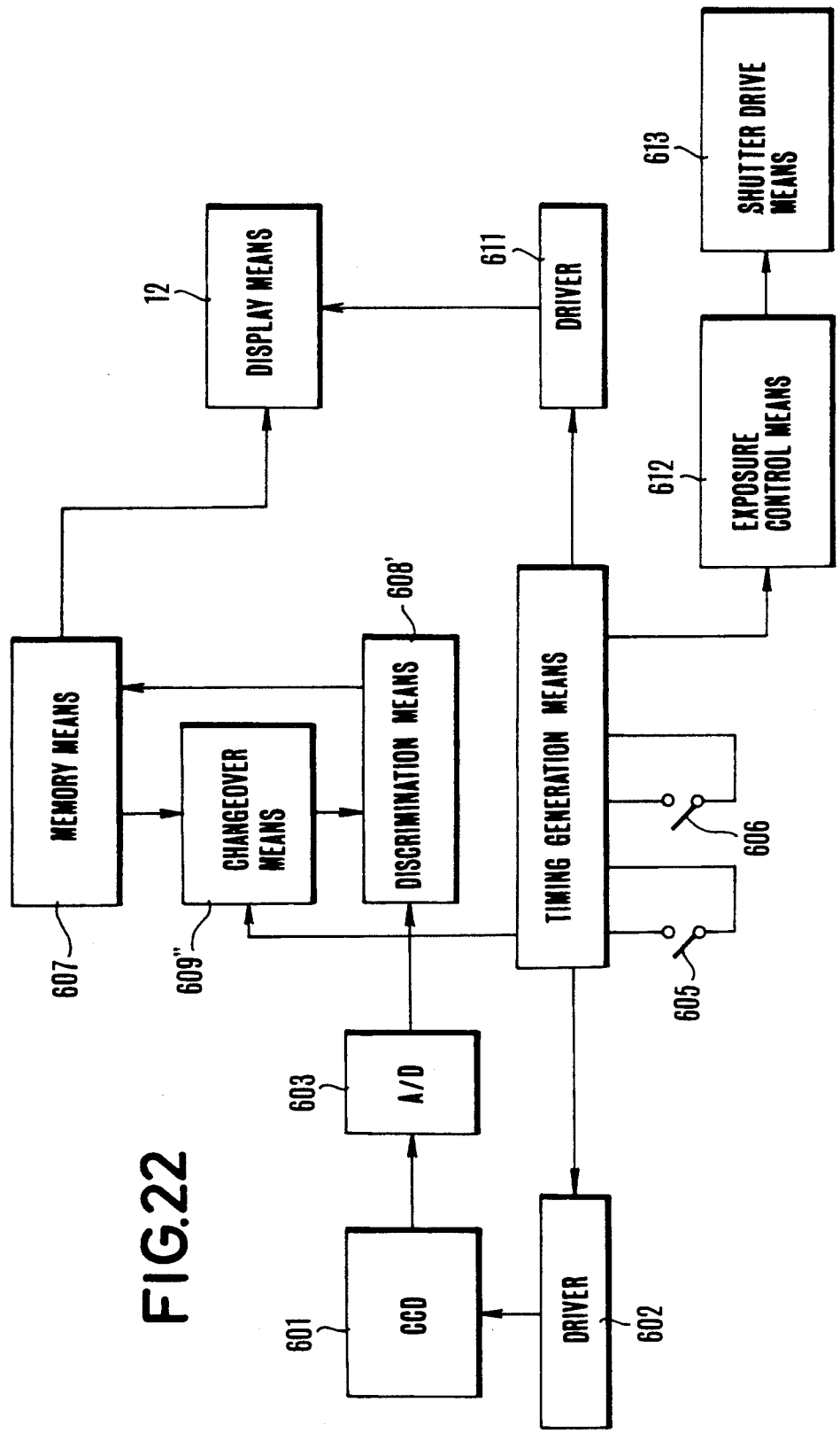
FIG. 22 is a block diagram illustrating another example of the circuit structure of the third embodiment.

FIG. 22 shows still another arrangement of this embodiment.

This arrangement is an example of making a control of whether or not the output of the memory means 607 in the arrangement of FIG. 17 is sent to the discrimination means 608' by changeover means 609" of similar construction to that of the changeover means 609 shown in FIG. 20. The other parts are similar to those of FIG. 17 and denoted by the same reference characters.

That is, when the changeover means 609" does not send the output of the memory means 607 to the discrimination means 608', the output sent from the A/D converter 603 to the discrimination means 608' is always larger than that sent from the changeover means 609" to the discrimination means 608', it results that the discrimination means 608' continues rewriting the data in the memory means 607 by the output data of the A/D converter 603 as it is.

When the switch 606 turns on, the shutter opens. The changeover means 609" produces the data of the memory means 607 to the discrimination means 608'. The discrimination means 608' compares it with the output of the A/D converter 603 and uses the data of higher brightness in rewriting the data of the memory means 607. Therefore, an equivalent image to the shot image is obtained on the display means 12. Even in this case, if, as has been described above, the timing is so set that the data of the memory means 607 is not rewritten in the interval from the closure of the shutter to the "OFF" of the switch 606, the photographer can see an equivalent image to the state of the image exposed on the film by the display means.

Figure 23:
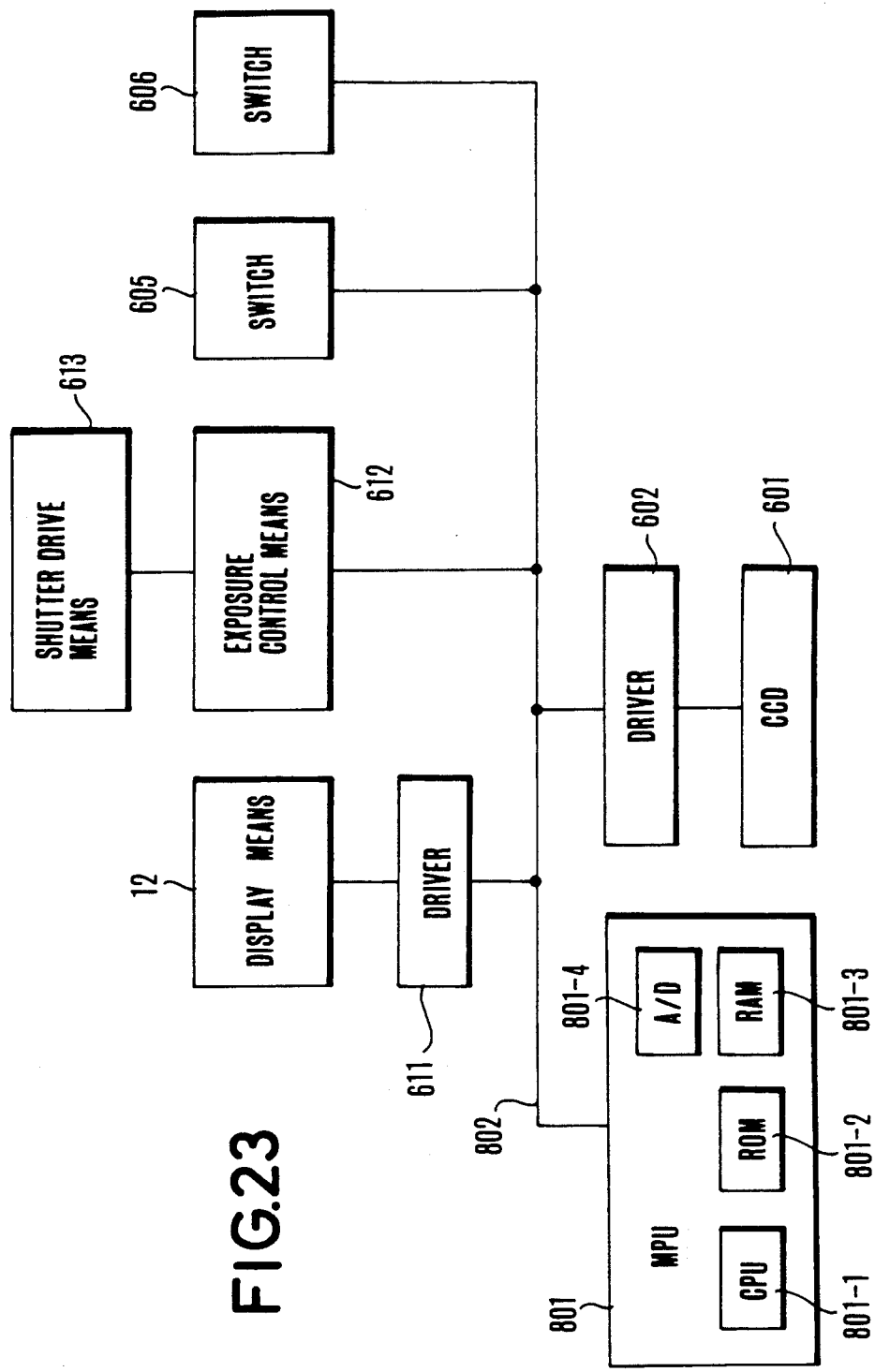
FIG. 23 is a block diagram illustrating another example of the circuit structure of the third embodiment.

FIG. 23 shows still another arrangement of this embodiment.

This arrangement is an example of utilizing a microcomputer as the timing generation circuit 604, discrimination means 608 and changeover means 609 in the arrangement of FIG. 17.

For note, the similar parts to those of FIG. 17 are denoted by the same reference characters. In FIG. 23, 801 is the microcomputer (MPU). The MPU 801 performs not only the control program shown in FIGS. 24(A)–24(C), but also the control concerning a photographic shot. The MPU 801 includes a computing unit (CPU) 801-1, a read only memory (ROM) 801-2, a random access memory (RAM) 801-3 and an analog-to-digital (A/D) converter 801-4.

Figure 24A:
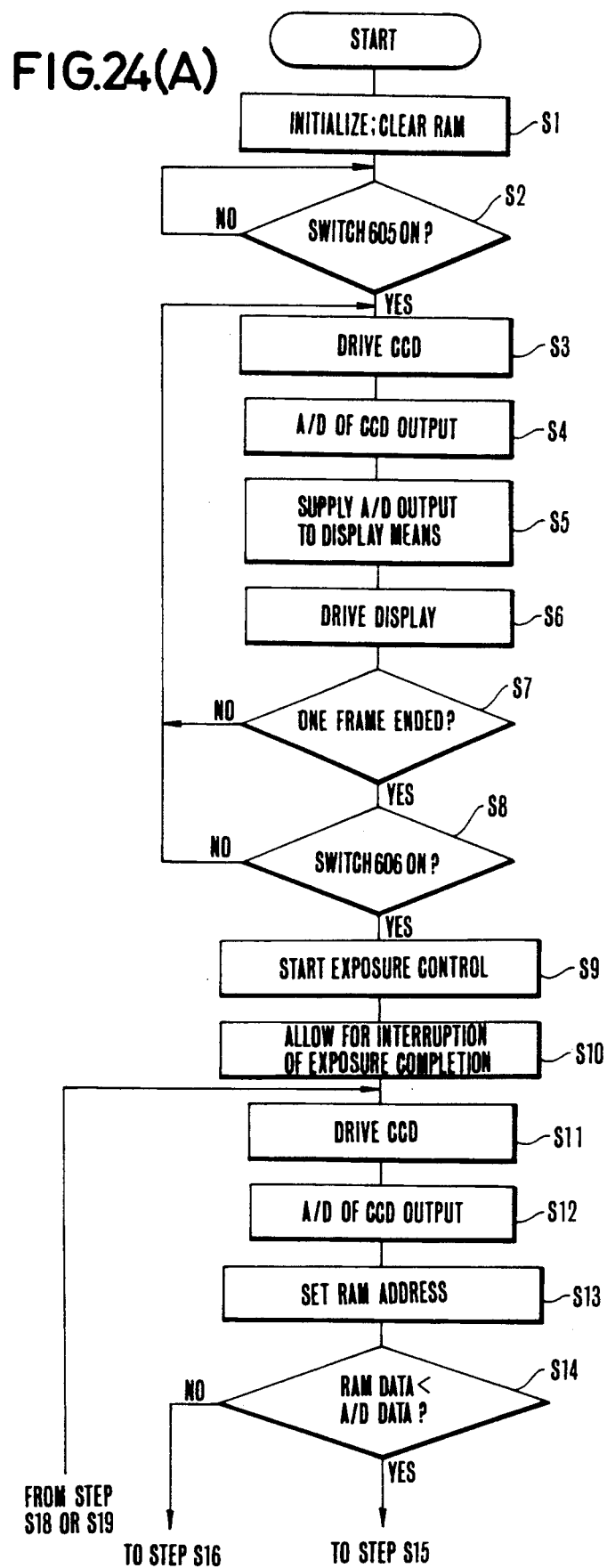
Figure 24C:
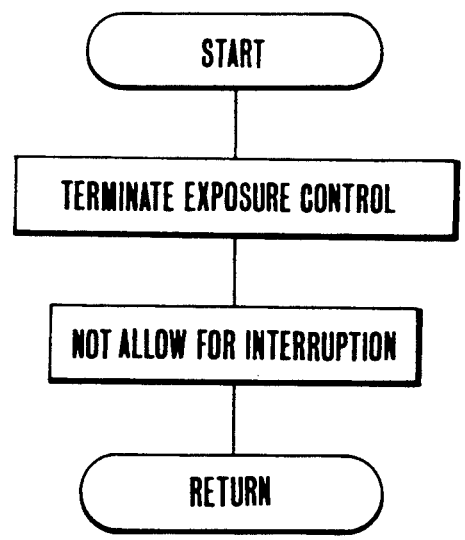

The ROM 801-2 contains the control program shown in FIGS. 24(A)–24(C). RAM 801-3 stores the variables to be used in this control program and the image data picked up by the CCD 601 and digitized by the A/D converter 801-4.

The control program the MPU 801 performs is explained by reference to FIGS. 24(A)–24(C).

In FIG. 24(A), when the electrical power source in the camera body is thrown, the CPU 801-1 performs initialization of the constituent units such as clear of the RAM 801-3 and waits for closure of the switch 605 (steps S1–S2).

Then, the CPU 801-1 drives the CCD driver 602 and brings the photo-electrically transduced image data by the CCD 601 into the MPU 801 in each picture element in sequence. By the A/D converter 801-4, this analog signal is converted to a digital signal (steps S3–S4). Then, the digitized image data is sent to the display means 12, and an object image is displayed on the display means 12 (steps S5–S6). Such a procedure is repeated over the image data of one picture frame. In a step S8, whether or not the switch 606 has turned on is tested. If not, then return to the step S3. Therefore, until the switch 606 turns on, the object image is displayed on the display means 12. When the switch 606 turns on, the CPU 801-1 commands the exposure control means 612 to start an exposure of the film (step S9).

Then, the MPU 801 allows for interruption of an exposure completion signal from the exposure control means 612. For note, when the MPU 801 receives the exposure completion signal from the exposure control means 612, it performs the control program shown in FIG. 24(C) to terminate the exposure control, and hinders the interruption of the signal from the exposure control means 612 (step S10).

Then, the CPU 801-1 compares the image data from the CCD 601 with the image data of the corresponding position stored in the RAM 801-3 in respect to brightness (steps S11–S14). If the brightness of the data from the CCD 601 is larger, this data is written in the RAM 801-3 (step S15).

If the brightness of the stored data is larger, then advance to a step S16.

In the step S16, the image data (picture element data) stored in the RAM 801-3 is outputted to the display means 12 so that the display of the display means 12 is renewed for the image data for one frame. Then, whether or not the CPU 801 has been interrupted by the exposure completion signal from the exposure control means 612 is judged. If no interruption has occurred, then return to the step S11 to repeat the above-described sequence of operations. Therefore, in the display means 12, during the interval from the "ON" of the switch 606 to the closure of the shutter, the data of higher brightness in each picture element is displayed.

After the closure but before the "OFF" of the switch 605, the image data stored in the RAM 801-3 continues being displayed (steps S20–S23).

Also, when the switch 605 turns off, as it implies the end of the shooting, the execution of this control program ends.

For note, though in this arrangement the comparison, writing and display of the image data has been made to recycle in each picture element, the above-described treatments may otherwise be performed in, for example, each frame unit of the CCD 601. For this case, the image data of one frame to be A/D converted in the step S8 are stored in different areas from that for the above-described stored data in the RAM 801-3, when the comparing treatment and others are carried out.

Also, though, in this arrangement, the RAM 801-3 is made incorporated within the MPU 801, it is needless to say that a number of additional RAMs may be connected to the system bus depending on the number of picture elements in the CCD 601.

Though, in this embodiment, when a hand shake occurs with a brightness change, the image in the memory means is rewritten by information of higher brightness, it may be rewritten by other information than such higher brightness information, for example, particular color signal, or maximum or minimum brightness signal. The essence is that when the video signals of the memory means are reproduced to monitor, the hand shake state can be seen. Also, though the memory means has been of the digital type, the invention is not confined to any sort of memory.

As has been described above, according to the present invention, the image blur display device is provided with comparing means for comparing the image information in a first time with the image information in a second time and display means responsive to the output of the comparing means for displaying where the image has changed as the image blur information, thereby it being made possible to accurately see the blurring state of the image. This permits the photographer, for example, to accurately judge whether or not the hand shake is acceptable to the photograph taken. Therefore, an advantage is produced that the necessity of shooting twice on account of the hand shake is eliminated, and effective shots become possible to take.

What is claimed is:

1. An image blur displaying device comprising:
   (A) image signal forming means for forming an image signal of an object to be photographed;
   (b) detection means for detecting a change of said image signal caused along time during an exposure time; and
   (C) display means for displaying the change of said image signal along time detected by said detection means as an information of an image blur caused during said exposure time.

2. A device according to claim 1, wherein said detection means further comprises comparing means for comparing a first image signal formed in a first time by said image signal forming means with a second image signal formed in a second time by said image signal forming means.

3. A device according to claim 2, wherein said detection means includes comparing means for comparing a first image signal formed in a first time by said image signal forming means with a second image signal formed in a second time by said image signal forming means and said comparing means is arranged to repeat said comparing operation even to an image signal formed by said image signal forming means in a different time than said first and said second times.

4. A device according to claim 3, wherein said comparing means includes adding-up means for adding up the places in which said image signals have changed, and said display means presents a display responding to the output of said adding-up means.

5. A device according to claim 2, wherein said detecting means includes comparing means for comparing a first image signal formed in a first time by said image signal forming means with a second image signal formed in a second time by said image signal forming means and further comprising alarm means responsive to attainment of the output of said comparing means to a predetermined value for producing an alarm.

6. A device according to claim 2, wherein said detection means includes comparing means for comparing a first image signal formed in a first time by said image signal forming means with a second image signal formed in a second time by said image signal forming means and wherein said comparing means includes discriminating means for causing said display means to display the place where said second image signal has changed to a higher brightness than said first image signal as the image blur information.

7. A device according to claim 2, wherein said detection means includes comparing means for comparing a first image signal formed in a first time by said image signal forming means with a second image signal formed in a second time by said image signal forming means and said comparing means includes memory means for storing said first image signal.

8. A device according to claim 1, wherein said display means includes means for displaying a real-time image under a first stroke condition of a shutter release button and displays the change of the image signal along time detected by said detection means under a second stroke condition of the shutter release button.

9. A camera having an image blur displaying device, comprising:
(A) image signal forming means for forming an image signal of an object to be photographed;
(B) detection means for detecting a change of said image signal caused along time during an exposure time; and
(C) display means for displaying the change of said image signal along time detected by said detection means as an information of an image blur caused during said exposure time.

10. A camera according to claim 9, wherein said detection means further comprises comparing means for comparing a first image signal formed in a first time by said image signal forming means with a second image signal formed in a second time by said image signal forming means.

11. A device according to claim 10, wherein said detection means includes comparing means for comparing a first image signal formed in a first time by said image signal forming means with a second image signal formed in a second time by said image signal forming means and further comprising alarm means responsive to attainment of the output of said comparing means to a predetermined value for producing an alarm.

12. A device according to claim 10, wherein said detection means includes comparing means for comparing a first image signal formed in a first time by said image signal forming means with a second image signal formed in a second time by said image signal forming means and wherein said comparing means includes discriminating means for causing said display means to display the place where said second image signal has changed to a higher brightness than said first image signal as the image blur information.

13. A device according to claim 10, wherein said detection means includes comparing means for comparing a first image signal formed in a first time by said image signal forming means with a second image signal formed in a second time by said image signal forming means and said comparing means includes memory means for storing said first image signal.

14. A device according to claim 10, wherein said detection means includes comparing means for comparing a first image signal formed in a first time by said image signal forming means with a second image signal formed in a second time by said image signal forming means and said comparing means is arranged to repeat said comparing operation even to an image signal formed by said image signal forming means in a different time than said first and said second times.

15. A camera according to claim 9, wherein said detection means includes comparing means for comparing a first image signal formed in a first time by said image signal forming means with a second image signal formed in a second time by said image signal forming means and wherein said comparing means includes adding-up means for adding up the places in which said image signals have changed, and said display means presents a display responding to the output of said adding-up means.

16. A camera according to claim 7, wherein said display means includes means for displaying a real-time image under a first stroke condition of a shutter release button and displays the change of the image signal along time detected by said detection means under a second stroke condition of the shutter release button.

* * * * *

UNITED STATES PATENT AND TRADEMARK OFFICE
CERTIFICATE OF CORRECTION

PATENT NO. : 5,060,007

DATED : October 22, 1991

INVENTOR(S) : Akira Egawa

Page 1 of 6

It is certified that error appears in the above-identified patent and that said Letters Patent is hereby corrected as shown below:

| | |
|---|---|
| Col. 1, line 24. | Delete with a possibility |
| Col. 1, line 36. | Delete "So" and change "to" to -- To -- |
| Col. 1, line 41. | Change "the only" to -- only the -- |
| Col. 1, line 65. | Change "of" to -- in -- |
| Col. 2, line 1. | Change "is" to -- shows -- |
| Col. 2, line 18. | Change "in" to -- of -- |
| Col. 2, line 22. | Change "is" to -- shows -- |
| Col. 2, line 26. | After "the" insert -- detailed -- |
| Col. 2, line 32. | Change "4" to -- 14 -- |
| Col. 2, line 37. | Change "in" to -- of -- |
| Col. 2, line 60. | Change "in" to -- of -- |
| Col. 3, line 1. | After "is" insert -- a -- |
| Col. 3, line 8. | Change "in" to -- of -- |
| Col. 3, line 24. | After "is" insert -- a -- |
| Col. 3, line 26. | After "is" insert -- a -- |
| Col. 3, line 39. | After "is" insert -- a -- |
| Col. 3, line 49. | After "is" insert -- a -- |
| Col. 3, line 50. | After "is" insert -- a -- |
| Col. 3, line 59. | Change "removes the depression" to -- releases the button -- |
| Col. 4, line 13. | Delete "For note," and change "similarly" to -- Similarly -- |
| Col. 6, line 5. | After ""ON"" insert -- state -- |

UNITED STATES PATENT AND TRADEMARK OFFICE
CERTIFICATE OF CORRECTION

PATENT NO. : 5,060,007

DATED : October 22, 1991

INVENTOR(S) : Akira Egawa

It is certified that error appears in the above-identified patent and that said Letters Patent is hereby corrected as shown below:

| | | |
|---|---|---|
| Col. 6, line 12. | After ""ON"" insert -- state -- |
| Col. 6, line 21. | Change "For note, though," to -- While -- |
| Col. 6, line 65. | Delete "For note," |
| Col. 7, line 15. | Delete "For note, the" and change "similar" to -- Similar -- |
| Col. 7, line 53. | Delete "For note," and change "when" to -- When -- |
| Col. 7, line 57. | Change "thereby" to -- whereby -- |
| Col. 7, line 65. | Change "by" to -- for -- |
| Col. 8, line 23. | Delete "For note," and change "if" to -- If -- |
| Col. 8, line 50. | Change "to" to -- as -- |
| Col. 8, line 54. | Change "to" to -- as -- |
| Col. 9, line 18. | Change "on" to -- in -- |
| Col. 9, line 43. | After "between" insert -- a -- |
| Col. 9, line 57. | Delete "For note," and change "the" to -- The -- |
| Col. 9, line 60. | Delete ", too," |
| Col. 10, line 6. | After "therefrom" insert -- is -- |
| Col. 10, line 35. | After ""ON"" insert -- state -- |
| Col. 10, line 36. | After ""ON"" insert -- state -- |
| Col. 10, line 38. | Delete "all" |
| Col. 11, line 9. | Delete "For note," and change "for" to -- For -- |

UNITED STATES PATENT AND TRADEMARK OFFICE
CERTIFICATE OF CORRECTION

PATENT NO. : 5,060,007             Page 3 of 6

DATED : October 22, 1991

INVENTOR(S) : Akira Egawa

It is certified that error appears in the above-identified patent and that said Letters Patent is hereby corrected as shown below:

| | |
|---|---|
| Col. 11, line 14. | Change "brings" to -- bring -- |
| Col. 11, line 20. | Delete "For note," and change "the" first occurrence to -- The -- |
| Col. 11, line 30. | Delete "For note, the" and change "similar" to -- Similar -- |
| Col. 11, line 51. | Change "thrown" to -- applied -- |
| Col. 12, line 3. | Delete "For note," and change "when" to -- When -- |
| Col. 12, line 17. | Change "in" to -- to -- |
| Col. 12, line 32. | Delete "For note," and change "though" to -- Though -- |
| Col. 12, line 34. | Change "made to continue" to -- continually -- |
| Col. 12, line 42. | Delete "For note," and change "the" second occurrence to -- The -- |
| Col. 12, line 63. | Delete "For note," and change "if" to -- If -- |
| Col. 13, line 3. | Change "frame is made to transfer" to -- frames are transferred -- |
| Col. 13, line 61. | Delete "For note," and change "the" to -- The -- |
| Col. 14, lines 15-16. | Delete "For note," and change "by" to -- By -- |
| Col. 14, line 17. | After "is" insert -- also -- |
| Col. 14, line 18. | Delete "too" |

UNITED STATES PATENT AND TRADEMARK OFFICE
CERTIFICATE OF CORRECTION

PATENT NO. : 5,060,007  
DATED : October 22, 1991  
INVENTOR(S) : Akira Egawa

Page 4 of 6

It is certified that error appears in the above-identified patent and that said Letters Patent is hereby corrected as shown below:

| | |
|---|---|
| Col. 14, line 30. | Delete "For note," and change "for" to -- For -- |
| Col. 14, line 52. | Delete "it results that" |
| Col. 14, line 59. | After ""OFF"" insert -- state -- |
| Col. 15, line 4. | Delete "goes to" and change "change" to -- changes -- |
| Col. 15, line 21. | Change "an" to -- a -- |
| Col. 15, line 37. | After ""ON"" insert -- state -- |
| Col. 15, line 57. | Delete "For note," and change "the" first occurrence to -- The -- |
| Col. 16, line 2. | After ""ON"" insert -- state -- |
| Col. 16, line 3. | After ""ON"" insert -- state -- |
| Col. 16, line 15. | Delete "For note," and change "in" to -- In -- |
| Col. 16, line 28. | After ""OFF"" insert -- state -- |
| Col. 16, line 34. | Delete "making a" |
| Col. 16, line 47. | Delete "it results that" |
| Col. 16, line 61. | After ""OFF"" insert -- state -- |
| Col. 17, line 3. | Delete "For note," and change "the" to -- The -- |
| Col. 17, line 21. | Change "thrown" to -- applied -- |
| Col. 17, line 35. | After "return" insert -- is -- |
| Col. 17, line 42. | Delete "For note," and change "when" to -- When -- |

UNITED STATES PATENT AND TRADEMARK OFFICE
CERTIFICATE OF CORRECTION

PATENT NO. : 5,060,007

DATED : October 22, 1991

INVENTOR(S) : Akira Egawa

It is certified that error appears in the above-identified patent and that said Letters Patent is hereby corrected as shown below:

| | | |
|---|---|---|
| Col. 17, line 55. | After "advance" insert -- is -- | |
| Col. 17, line 64. | After "return" insert -- is -- | |
| Col. 17, line 66. | After ""ON"" insert -- state -- | |
| Col. 18, line 1. | After ""OFF"" insert -- state -- | |
| Col. 18, line 7. | Delete "For note, " and change "though" to -- While -- | |
| Col. 18, line 16. | Change "though" to -- while -- | |
| Col. 18, line 17. | Delete "made" | |
| Col. 18, line 25. | Before "particular" insert -- a -- | |
| Col. 18, line 26. | After "or" insert -- a -- | |
| Col. 18, line 28. | After "to" insert -- the -- | |
| Col. 18, line 38. | After "thereby" insert -- making -- | |
| Col. 18, line 39. | Delete "being made" | |
| Col. 18, line 43. | After "produced" insert -- in -- | |
| Col. 20, line 38. | Change "9" to -- 10 -- | |

UNITED STATES PATENT AND TRADEMARK OFFICE
CERTIFICATE OF CORRECTION

PATENT NO. : 5,060,007
DATED : October 22, 1991
INVENTOR(S) : Akira Egawa

It is certified that error appears in the above-indentified patent and that said Letters Patent is hereby corrected as shown below:

Column 20, line 48, change "7" to --9--.

Signed and Sealed this

Twenty-first Day of December, 1993

Attest:

BRUCE LEHMAN

Attesting Officer
Commissioner of Patents and Trademarks